US012608105B2

(12) United States Patent　　　　　(10) Patent No.:　　US 12,608,105 B2
Ferguson et al.　　　　　　　　　　　　(45) Date of Patent:　　　Apr. 21, 2026

(54) DETERMINING AN UNPROMPTED PRESSURE

(71) Applicant: Cirque Corporation, Sandy, UT (US)

(72) Inventors: Daniel Ferguson, Herriman, UT (US);
Brian Monson, Farmington, UT (US);
Ethan Sturm, Salt Lake City, UT (US)

(73) Assignee: Cirque Corporation, Sandy, UT (US)

( * ) Notice:　Subject to any disclaimer, the term of this patent is extended or adjusted under 35 U.S.C. 154(b) by 0 days.

(21) Appl. No.: 18/929,278

(22) Filed:　　Oct. 28, 2024

(65)　　　　　Prior Publication Data

US 2026/0056632 A1　　Feb. 26, 2026

Related U.S. Application Data

(63) Continuation-in-part of application No. 18/809,924, filed on Aug. 20, 2024, now Pat. No. 12,422,960.

(51) Int. Cl.
　G06F 3/041　　　(2006.01)
　G06F 3/044　　　(2006.01)
(52) U.S. Cl.
　CPC ............ G06F 3/0418 (2013.01); G06F 3/044 (2013.01)
(58) Field of Classification Search
　None
　See application file for complete search history.

(56)　　　　　References Cited

U.S. PATENT DOCUMENTS

| | | | |
|---|---|---|---|
| 8,604,364 B2 | 12/2013 | Simon | |
| 9,430,147 B2 | 8/2016 | Luo | |
| 11,449,123 B2 | 9/2022 | Li | |
| 11,836,317 B2 | 12/2023 | Yang | |
| 2013/0201155 A1 | 8/2013 | Wu | |
| 2015/0074615 A1* | 3/2015 | Han | H04L 63/105 |
| | | | 715/863 |
| 2017/0336891 A1* | 11/2017 | Rosenberg | G06F 3/04144 |
| 2018/0181735 A1* | 6/2018 | Yang | G06F 21/36 |
| 2023/0110133 A1 | 4/2023 | Dhar | |

FOREIGN PATENT DOCUMENTS

| | | | | |
|---|---|---|---|---|
| CN | 114626054 A * | 6/2022 | ............ | G06F 21/46 |
| WO | WO-2018129966 A1 * | 7/2018 | ......... | G06V 40/1365 |

* cited by examiner

*Primary Examiner* — Duane N Taylor, Jr.

(57)　　　　　　　ABSTRACT

A capacitance module may include a set of electrodes, a processor in communication with the set of electrodes and memory in communication with the processor. The memory may include programmed instructions that cause the capacitance module, when executed, to perform a calibration, the calibration including prompting a press input, storing a press attribute of a press measurement associated with the press input, and determining a type of unprompted input by consulting the stored press attribute.

20 Claims, 26 Drawing Sheets

500

508

502

510

504

506

512

604

604

604

604

Press the trackpad again
with your finger.

2100

2106

2110

2102

2104

2108

2300

2302

Detect capacitance input

2304

Quantize sensor data

2306

Quantized sensor data within acceptable range?

yes

2308

Compare sensor data to stored data-pressure map no

Fail to classify input pressure

Classify input pressure based on comparison

2310

2312

2500

2502

Prompt a press input

2504

Store a press attribute of a press measurement associated with the press input

2506

Prompt a touch input

2508

Store a touch attribute of a touch measurement associated with the touch input

2510

Determine a pressure of an unprompted input by consulting at least one of the stored press attribute and the stored touch attribute

2600

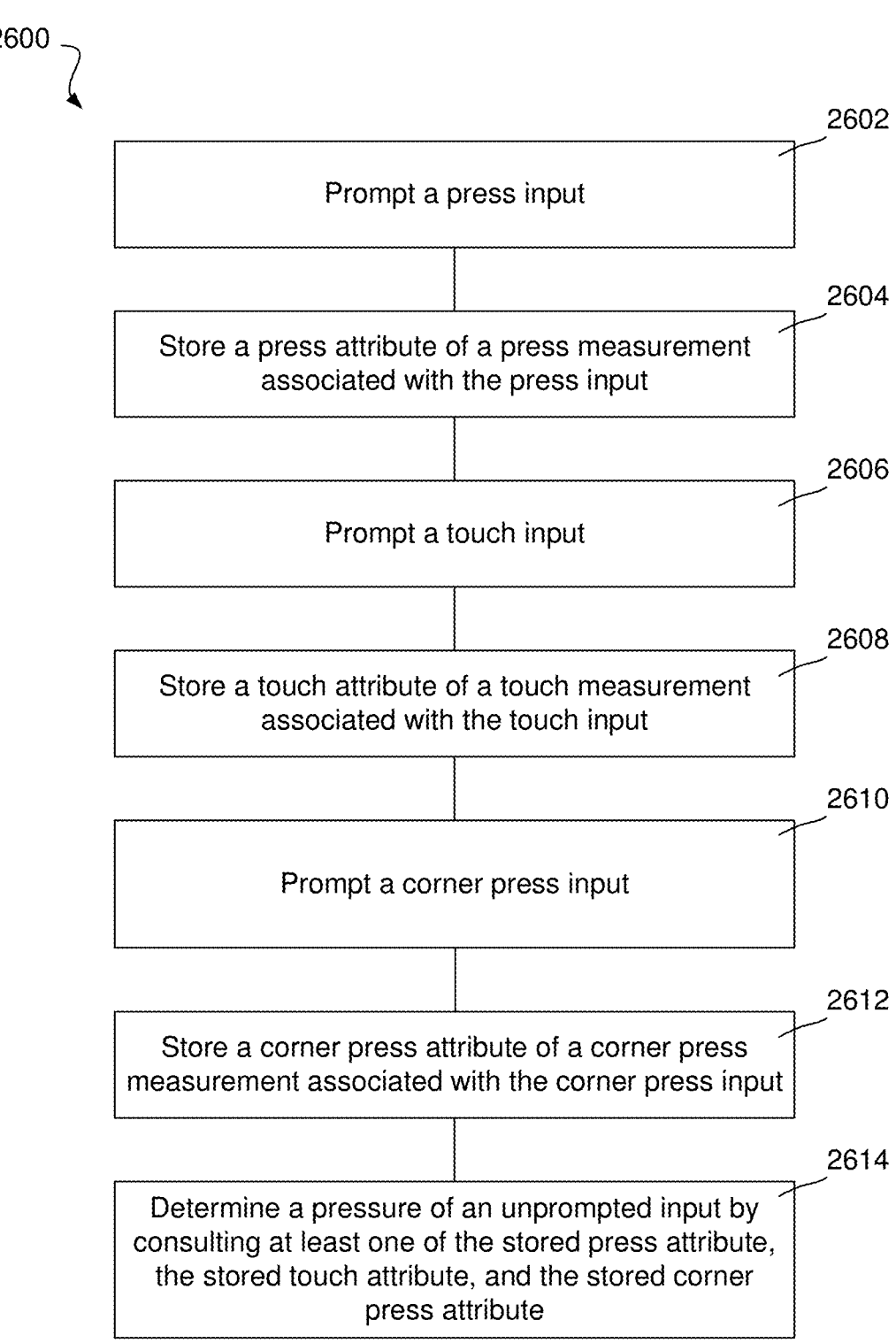

2602

Prompt a press input

2604

Store a press attribute of a press measurement associated with the press input

2606

Prompt a touch input

2608

Store a touch attribute of a touch measurement associated with the touch input

2610

Prompt a corner press input

2612

Store a corner press attribute of a corner press measurement associated with the corner press input

2614

Determine a pressure of an unprompted input by consulting at least one of the stored press attribute, the stored touch attribute, and the stored corner press attribute

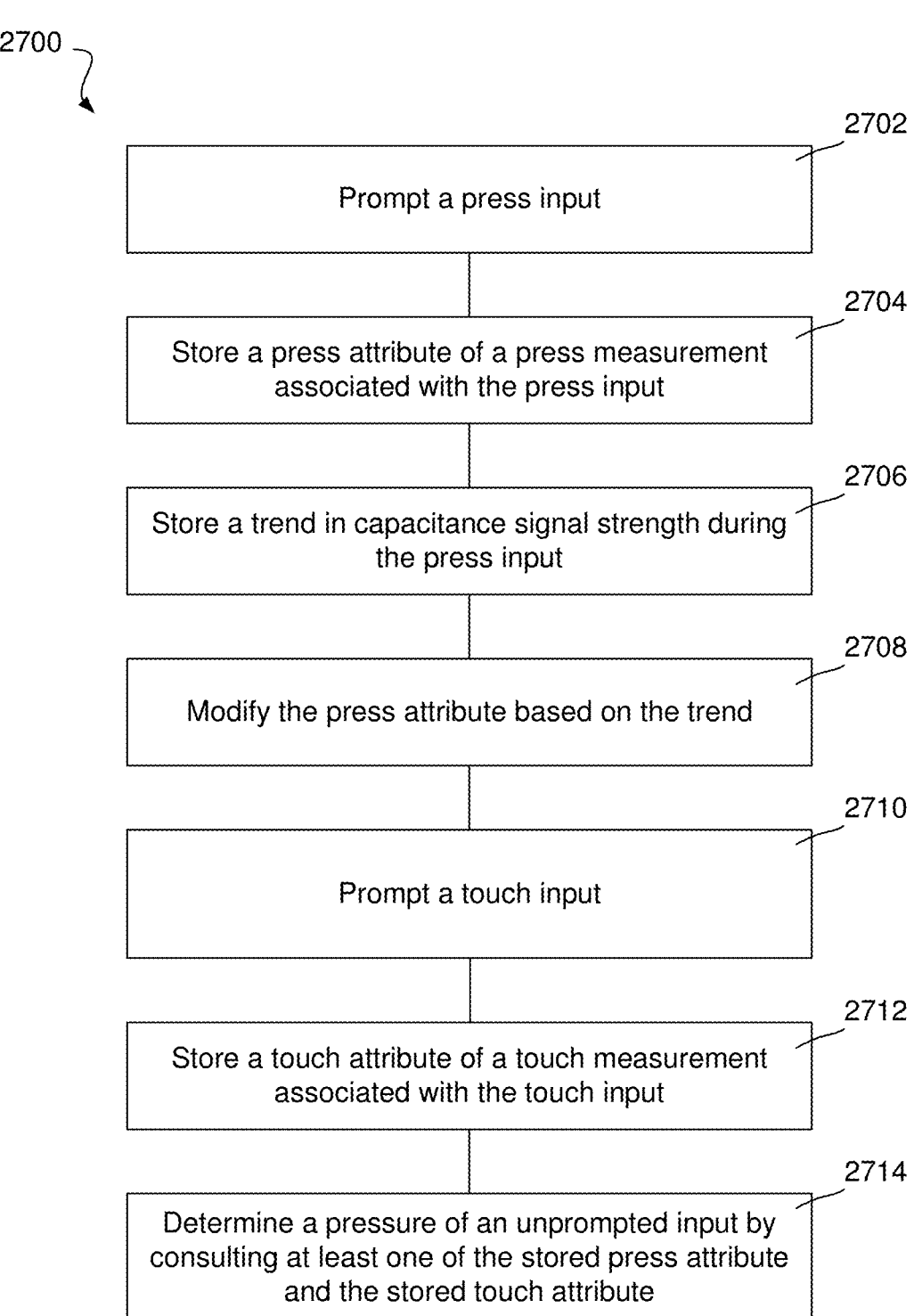

2702

Prompt a press input

2704

Store a press attribute of a press measurement associated with the press input

2706

Store a trend in capacitance signal strength during the press input

2708

Modify the press attribute based on the trend

2710

Prompt a touch input

2712

Store a touch attribute of a touch measurement associated with the touch input

2714

Determine a pressure of an unprompted input by consulting at least one of the stored press attribute and the stored touch attribute

*Fig. 27*

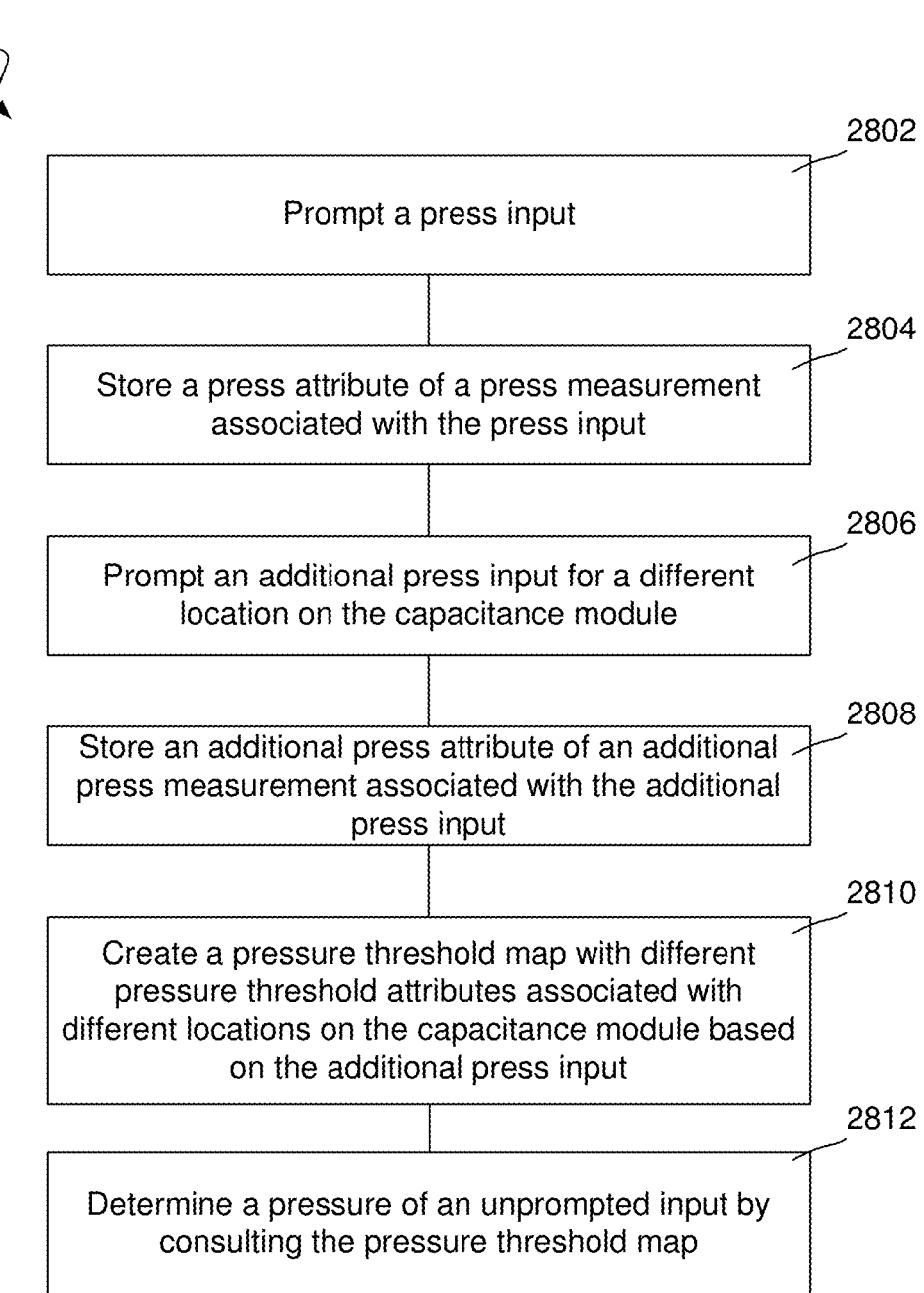

2800

2802
Prompt a press input

2804
Store a press attribute of a press measurement associated with the press input 2806
Prompt an additional press input for a different location on the capacitance module 2808
Store an additional press attribute of an additional press measurement associated with the additional press input 2810
Create a pressure threshold map with different pressure threshold attributes associated with different locations on the capacitance module based on the additional press input 2812
Determine a pressure of an unprompted input by consulting the pressure threshold map

*Fig. 28*

DETERMINING AN UNPROMPTED PRESSURE

CROSS REFERENCE TO RELATED APPLICATIONS

This application is a continuation-in-part of U.S. patent application Ser. No. 18/809,924 titled Determining an Unprompted Input filed on Aug. 20, 2024. U.S. patent application Ser. No. 18/809,924 is herein incorporated by reference for all that it discloses.

FIELD OF THE DISCLOSURE

This disclosure relates generally to systems and methods for enhancing input accuracy in capacitive devices. In particular, this disclosure relates to systems and methods for improving pressure detection of inputs of capacitive devices.

BACKGROUND

Pressure sensing has become an increasingly important feature in modern trackpads, enabling a wider range of interactions and more natural, intuitive control. By detecting and interpreting different levels of pressure applied by the user's fingers, trackpads can offer enhanced functionality and user experience. However, implementing reliable and accurate pressure sensing in trackpads presents several challenges.

An example of a capacitive input device with pressure sensing is disclosed in U.S. Pat. No. 10,359,848 issued to Andrew E. Winter, et al. This reference discloses input device haptics and pressure sensing techniques. An input device includes an outer surface, a pressure sensor and haptic feedback mechanism, and a pressure sensing and haptic feedback module. The outer surface is configured to receive an application of pressure by an object. The pressure sensor and haptic feedback mechanism has one or more piezos configured to detect and quantify an amount of the application of the pressure to the outer surface by the object, the one or more piezos configured to output a signal indicating the quantified amount of the pressure. The pressure sensing and haptic feedback module is configured to receive the signal from the one or more piezos indicating the quantified amount of the pressure and control the haptic feedback of the pressure sensor and haptic feedback mechanism.

Another example of pressure sensing of inputs in capacitive input devices is disclosed in U.S. Pat. No. 10,275,068 issued to Storrs T. Hoen, et al. This reference discloses an electronic device that has a force sensor that determines a measure of applied force from a user contacting a cover glass of the device. In one embodiment, a frame at least partially encloses an interior of the electronic device and has an open end. A cover glass covers the open end of the frame and is movable connected to the frame to allow movement of the cover glass in response to one or more forces applied to an external surface of the cover glass. A plurality of strain probes is positioned under the cover glass, between the cover glass and the frame, and is arranged to output a plurality of strain signals response to the one or more forces applied to the cover glass. A force processing module is configured to at least calculate an amount of force applied to the cover glass based on the plurality of strain signals.

Each of these references are herein incorporated by reference for all that they disclose.

SUMMARY

In one embodiment, a capacitance module may include a set of electrodes, a processor in communication with the set of electrodes, and memory in communication with the processor. The memory may include programmed instructions that cause the capacitance module, when executed, to perform a calibration. The calibration may include prompting a press input, storing a press attribute of a press measurement associated with the press input, and determining a pressure of an unprompted input by consulting the stored press attribute.

The calibration may further include prompting a touch input and storing a touch attribute associated with the touch input. Determining the pressure of the unprompted input may include consulting at least one of the stored press attribute and the touch attribute.

The calibration may further include prompting a double press input and storing a double press attribute of a double press measurement associated with the double press input. Determining the pressure of the unprompted input may include consulting at least one of the stored press attribute, the touch attribute, and the double press attribute.

The calibration may further include prompting a corner press input and storing a corner press attribute of a corner press measurement associated with the corner press input. The corner press attribute may include a different pressure measurement than the pressure attribute.

The calibration may further include prompting a finger press input, storing a finger press attribute of a finger press measurement associated with the finger press input, prompting a palm press input, and storing a palm press attribute of a palm press measurement associated with the palm press input.

The press attribute may include at least one contact area, capacitance signal strength, or capacitance signal trend.

The capacitance module may include a pressure sensor in communication with the processor. The press attribute may include a pressure magnitude.

The calibration may further include prompting multiple press inputs at different locations on the capacitance module and creating a pressure threshold map that varies across the surface of the capacitance module based on the multiple press inputs.

The calibration may further include prompting a subsequent press input and using a subsequent press attribute of a subsequent press measurement associated with the prompted subsequent press input to modify the stored press attribute.

The calibration may further include prompting a subsequent touch input and using a subsequent touch attribute of a subsequent touch measurement associated with the prompted subsequent touch input to modify the stored hard press attribute.

The capacitance module may further include creating a press attribute using a press machine learning model and training the press machine learning model with multiple press measurement from prompted press inputs at various locations on the capacitance module.

In another embodiment, a method for determining a press input on a capacitance module may include prompting a press input, storing a press attribute of a press measurement associated with the press input, prompting a touch input, storing a touch attribute of a touch measurement associated with the touch input, and determining a pressure of an unprompted input by consulting at least one of the stored press attribute and the stored touch attribute.

The method may also include prompting a corner press input and storing a corner press attribute of a corner press measurement associated with the corner press input. The corner press attribute may include a different pressure measurement than the pressure attribute.

The method may also include recording a trend in capacitance signal strength during the press input and the touch input and adjusting the press attribute based on the trend.

The method may further include prompting at least one additional press input for at least one different location on the capacitance module and creating a pressure threshold map with different pressure threshold attributes associated with different location of the capacitance module based on the additional press input.

In another embodiment, a computer-program product for determining a press input on a capacitance module may include a non-transitory computer-readable medium storing instructions executable by a processor to prompt a press input, store a press attribute of a press measurement associated with the press input, prompt a touch input, store a touch attribute of a touch measurement associated with the touch input, and determine a type of unprompted input by consulting at least one of the stored press attribute and the stored touch attribute.

The instructions may also be executable to prompt a corner press input and store a corner press attribute of a corner press measurement associated with the corner press input. Determining the type of unprompted input may include adjusting the pressure threshold based on the location of the input on the capacitance module.

The instructions may also be executable to record a trend in capacitance signal strength during the press input and adjust the press attribute based on the trend.

The instructions may also be executable to prompt an additional press input at a different location on the capacitance module and create a pressure threshold map with different pressure threshold attributes associated with different location of the capacitance module based on the additional press input.

BRIEF DESCRIPTION OF THE DRAWINGS

FIG. 26 depicts an example of a method for determining a pressure of an unprompted input in accordance with the disclosure.

FIG. 27 depicts an example of a method for determining a pressure of an unprompted input in accordance with the disclosure.

FIG. 28 depicts an example of a method for determining a pressure of an unprompted input in accordance with the disclosure.

Figure 1:
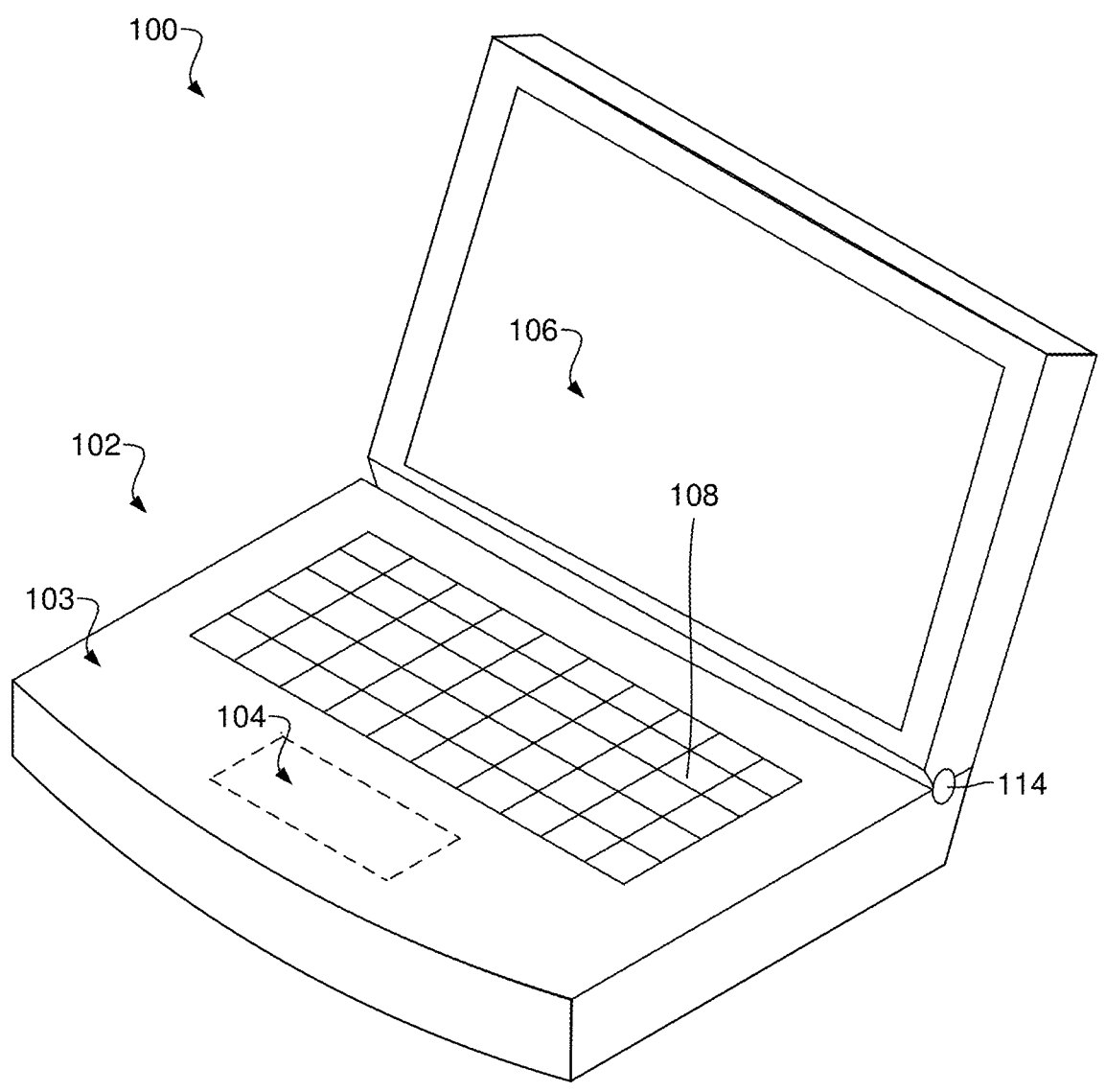
FIG. 1 depicts an example of an electronic device in accordance with the disclosure.

While the disclosure is susceptible to various modifications and alternative forms, specific embodiments have been shown by way of example in the drawings and will be described in detail herein. However, it should be understood that the disclosure is not intended to be limited to the particular forms disclosed. Rather, the intention is to cover all modifications, equivalents and alternatives falling within the spirit and scope of the invention as defined by the appended claims.

DETAILED DESCRIPTION OF THE INVENTION

This description provides examples, and is not intended to limit the scope, applicability, or configuration of the invention. Rather, the ensuing description will provide those skilled in the art with an enabling description for implementing embodiments of the invention. Various changes may be made in the function and arrangement of elements.

Thus, various embodiments may omit, substitute, or add various procedures or components as appropriate. For instance, it should be appreciated that the methods may be performed in an order different than that described, and that various steps may be added, omitted, or combined. Also, aspects and elements described with respect to certain embodiments may be combined in various other embodiments. It should also be appreciated that the following systems, methods, devices, and software may individually or collectively be components of a larger system, wherein other procedures may take precedence over or otherwise modify their application.

For purposes of this disclosure, the term "aligned" generally refers to being parallel, substantially parallel, or forming an angle of less than 35.0 degrees. For purposes of this disclosure, the term "transverse" generally refers to perpendicular, substantially perpendicular, or forming an angle between 55.0 and 125.0 degrees. For purposes of this disclosure, the term "length" generally refers to the longest dimension of an object. For purposes of this disclosure, the term "width" generally refers to the dimension of an object from side to side and may refer to measuring across an object perpendicular to the object's length.

For purposes of this disclosure, the term "electrode" may generally refer to a portion of an electrical conductor intended to be used to make a measurement, and the terms "route" and "trace" generally refer to portions of an electrical conductor that are not intended to make a measurement. For purposes of this disclosure in reference to circuits, the term "line" generally refers to the combination of an electrode and a "route" or "trace" portions of the electrical conductor. For purposes of this disclosure, the term "Tx" generally refers to a transmit line, electrode, or portions thereof, and the term "Rx" generally refers to a sense line, electrode, or portions thereof.

For the purposes of this disclosure, the term "electronic device" may generally refer to devices that can be transported and include a battery and electronic components. Examples may include a laptop, a desktop, a mobile phone, an electronic tablet, a personal digital device, a watch, a gaming controller, a gaming wearable device, a wearable device, a measurement device, an automation device, a security device, a display, a computer mouse, a vehicle, an infotainment system, an audio system, a control panel, another type of device, an athletic tracking device, a tracking device, a card reader, a purchasing station, a kiosk, or combinations thereof.

It should be understood that use of the terms "capacitance module," "touch pad" and "touch sensor" throughout this document may be used interchangeably with "capacitive touch sensor," "capacitive sensor," "capacitance sensor," "capacitive touch and proximity sensor," "proximity sensor," "touch and proximity sensor," "touch panel," "trackpad," "touch pad," and "touch screen." The capacitance module may be incorporated into an electronic device.

It should also be understood that, as used herein, the terms "vertical," "horizontal," "lateral," "upper," "lower," "left," "right," "inner," "outer," etc., can refer to relative directions or positions of features in the disclosed devices and/or assemblies shown in the Figures. For example, "upper" or "uppermost" can refer to a feature positioned closer to the top of a page than another feature. These terms, however, should be construed broadly to include devices and/or assemblies having other orientations, such as inverted or inclined orientations where top/bottom, over/under, above/below, up/down, and left/right can be interchanged depending on the orientation.

In some cases, the capacitance module is located within a housing. The capacitance module may be underneath the housing and capable of detecting objects outside of the housing. In examples, where the capacitance module can detect changes in capacitance through a housing, the housing is a capacitance reference surface. For example, the capacitance module may be disclosed within a cavity formed by a keyboard housing of a computer, such as a laptop or other type of computing device, and the sensor may be disposed underneath a surface of the keyboard housing. In such an example, the keyboard housing adjacent to the capacitance module is the capacitance reference surface. In some examples, an opening may be formed in the housing, and an overlay may be positioned within the opening. In this example, the overlay is the capacitance reference surface. In such an example, the capacitance module may be positioned adjacent to a backside of the overlay, and the capacitance module may sense the presence of the object through the thickness of the overlay. For the purposes of this disclosure, the term "reference surface" may generally refer to a surface through which a pressure sensor, a capacitance sensor, or another type of sensor is positioned to sense a pressure, a presence, a position, a touch, a proximity, a capacitance, a magnetic property, an electric property, another type of property, or another characteristic, or combinations thereof that indicates an input. For example, the reference surface may be a housing, an overlay, or another type of surface through which the input is sensed. In some examples, the reference surface has no moving parts. In some examples, the reference surface may be made of any appropriate type of material, including, but not limited to, plastics, glass, a dielectric material, a metal, another type of material, or combinations thereof.

For the purposes of this disclosure, the term "display" may generally refer to a display or screen that is not depicted in the same area as the capacitive reference surface. In some cases, the display is incorporated into a laptop where a keyboard is located between the display and the capacitive reference surface. In some examples where the capacitive reference surface is incorporated into a laptop, the capacitive reference surface may be part of a touch pad. Pressure sensors may be integrated into the stack making up the capacitance module. However, in some cases, the pressure sensors may be located at another part of the laptop, such as under the keyboard housing, but outside of the area used to sense touch inputs, on the side of the laptop, above the keyboard, to the side of the keyboard, at another location on the laptop, or at another location. In examples where these principles are integrated into a laptop, the display may be pivotally connected to the keyboard housing. The display may be a digital screen, a touch screen, another type of screen, or combinations thereof. In some cases, the display is located on the same device as the capacitive reference surface, and in other examples, the display is located on another device that is different from the device on which the capacitive reference surface is located. For example, the display may be projected onto a different surface, such as a wall or projector screen. In some examples, the reference surface may be located on an input or gaming controller, and the display is located on a wearable device, such as a virtual reality or augmented reality screen. In some cases, the reference surface and the display are located on the same surface, but on separate locations on that surface. In other examples, the reference surface and the display may be integrated into the same device, but on different surfaces. In some cases, the reference surface and the display may be oriented at different angular orientations with respect to each other.

For the purposes of this disclosure, the term "touch input" may generally refer to physical contact between a body part of the user or an implement (e.g., stylus) of the user and the reference surface of a capacitance module. Typically, the user will not intentionally push on the reference surface during a touch input. A touch input may involve a smaller contact area and generate a weaker capacitive signal compared to press inputs. In contrast, the term "press input" may generally refer to an input that also makes physical contact between the user (or the user's implement) but involves the user making a more deliberate push on the reference surface. Press inputs may be characterized by a larger contact area, higher capacitance signal strength, and potentially a faster rate of change in the capacitance signal compared to touch inputs.

For the purposes of this disclosure, the term "double tap" may generally refer to a gesture involving two quick successive touches on the reference surface of a capacitance module within a short time interval. The term "corner press" may generally refer to a press input applied specifically to the corner regions of a reference surface as opposed to the central areas. The term "palm input" may generally refer to physical contact between the reference surface and the user. In some cases, the palm input may be an inadvertent contact or when the user is resting of the user's palm on the reference surface of the capacitance module while typing or performing other activities. In other instances, a palm input may be intentional. The term "proximity input" may generally refer to an input occurring when an object, such as a finger, stylus, or palm is brought close to the reference surface of a capacitance module without making physical contact but is still detectable due to the change in capacitance detected with the capacitance module.

For the purposes of this disclosure, the terms "touch attribute," "press attribute," and the like may generally refer to a characteristic of a sensor measurement taken when an input is prompted during the calibration phase. This characteristics may include capacitance signal strength, a signal strength, a change in electrical resistance, a change in inductance, an inductance value, an impedance value, a change in impedance, voltage change, a voltage value, a magnetic value, a change a magnetic field, a time duration of a capacitance signal, a rate of change of capacitance, a contact area of an input, a pressure measurement, other defining features of an input, or combinations thereof. An attribute may be a single value, a range of values, a trend over time, a pattern, a category assignment, or other representation extracted from the raw sensor data.

For the purposes of this disclosure, the term "pressure attribute" may generally refer to a measurable characteristic or feature of a capacitance module input that is correlated with the applied pressure. Pressure attributes may include an absolute capacitance signal strength, a relative change in capacitance from a baseline level, a relative change in capacitance from a previous level, a rate of change of a capacitance signal over time, a surface area of a contact, an apparent shape and/or intensity of a proximity capacitance field, or other characteristics.

Pressure attributes may be represented as scalar values, time-series data, or visual patterns, depending on the sensing hardware and feature extraction techniques employed. During calibration, pressure attributes may be captured for known input types and used to train machine learning models.

For the purposes of this disclosure, the term "machine learning model" may generally refer to a computational model that can be trained to classify or predict outputs from inputs. In this context, a machine learning model may learn to classify or predict the pressure of inputs to the capacitance module based on patterns in the sensor data gathered by the capacitance module. Such machine learning models may be trained on datasets created from calibration inputs where the pressure labels of various inputs are known. Some common machine learning algorithms that may be applied in this context include by are not limited to logistic regression, decision trees, random forests, neural networks, k-means models, and k-nearest-neighbor's models. The choice of machine learning model may depend on the complexity of the input patterns and the desired granularity of pressure prediction.

For the purposes of this disclosure, the term "capacitance signal strength" may generally refer to the magnitude of the change in mutual or self-capacitance measured by sensing electrodes when an input object is present. A finger or palm in close proximity to a capacitance module may increase the apparent capacitance seen by the electrodes of the module, with a larger contact area or closer proximity resulting in a stronger capacitance signal. The raw capacitance signal is typically processed to remove baseline offsets and noise, resulting in a signal strength that may correlate to an input pressure. Capacitance, resistive, and/or inductive signal strength may be key pressure attributes used to distinguish between light touch inputs and firm press inputs on the reference surface of a capacitance module.

FIG. 1 depicts an example of an electronic device 100. In this example, the electronic device is a laptop. In the illustrated example, the electronic device 100 includes input components, such as a keyboard 102 and a capacitive module, such as a touch pad 104, that are incorporated into a housing 103. The electronic device 100 also includes a display 106. A program operated by the electronic device 100 may be depicted in the display 106 and controlled by a sequence of instructions that are provided by the user through the keyboard 102 and/or through the touch pad 104. An internal battery (not shown) may be used to power the operations of the electronic device 100.

The keyboard 102 includes an arrangement of keys 108 that can be individually selected when a user presses on a key with a sufficient force to cause the key 108 to be depressed towards a switch located underneath the keyboard 102. In response to selecting a key 108, a program may receive instructions on how to operate, such as a word processing program determining which types of words to process. A user may use the touch pad 104 to give different types of instructions to the programs operating on the computing device 100.

For example, a cursor depicted in the display 106 may be controlled through the touch pad 104. A user may control the location of the cursor by sliding his or her hand along the surface of the touch pad 104. In some cases, the user may move the cursor to be located at or near an object in the computing device's display and give a command through the touch pad 104 to select that object. For example, the user may provide instructions to select the object by tapping the surface of the touch pad 104 one or more times.

The touch pad 104 is a capacitance module that includes a stack of layers disposed underneath the keyboard housing, underneath an overlay that is fitted into an opening of the keyboard housing, or underneath another capacitive reference surface. In some examples, the capacitance module is located in an area of the keyboard's surface where the user's palms may rest while typing. The capacitance module may include a substrate, such as a printed circuit board or another type of substrate. One of the layers of the capacitance module may include a sensor layer that includes a first set of electrodes oriented in a first direction and a second layer of electrodes oriented in a second direction that is transverse the first direction. These electrodes may be spaced apart and/or electrically isolated from each other. The electrical isolation may be accomplished by depositing at least a portion of the electrodes on different sides of the same substrate or providing dedicated substrates for each set of electrodes. Capacitance may be measured at the overlapping intersections between the different sets of electrodes. However, as an object with a different dielectric value than the surrounding air (e.g., finger, stylus, etc.) approach the intersections between the electrodes, the capacitance between the electrodes may change. This change in capacitance and the associated location of the object in relation to the capacitance module may be calculated to determine where the user is touching or hovering the object within the detection range of the capacitance module. In some examples, the first set of electrodes and the second set of electrodes are equidistantly spaced with respect to each other. Thus, in these examples, the sensitivity of the capacitance module is the same in both directions. However, in other examples, the distance between the electrodes may be non-uniformly spaced to provide greater sensitivity for movements in certain directions.

In some cases, the display 106 is mechanically separate and movable with respect to the keyboard with a connection mechanism 114. In these examples, the display 106 and keyboard 102 may be connected and movable with respect to one another. The display 106 may be movable within a range of 0 degrees to 180 degrees or more with respect to the keyboard 102. In some examples, the display 106 may fold over onto the upper surface of the keyboard 102 when in a closed position, and the display 106 may be folded away from the keyboard 102 when the display 106 is in an operating position. In some examples, the display 106 may be orientable with respect to the keyboard 102 at an angle between 35 to 135 degrees when in use by the user. However, in these examples, the display 106 may be positionable at any angle desired by the user.

In some examples, the display 106 may be a non-touch sensitive display. However, in other examples at least a portion of the display 106 is touch sensitive. In these examples, the touch sensitive display may also include a capacitance module that is located behind an outside surface of the display 106. As a user's finger or other object approaches the touch sensitive screen, the capacitance module may detect a change in capacitance as an input from the user.

While the example of FIG. 1 depicts an example of the electronic device being a laptop, the capacitance sensor and touch surface may be incorporated into any appropriate device. A non-exhaustive list of devices includes, but is not limited to, a desktop, a display, a screen, a kiosk, a computing device, an electronic tablet, a smart phone, a location sensor, a card reading sensor, another type of electronic device, another type of device, or combinations thereof.

Figure 2:
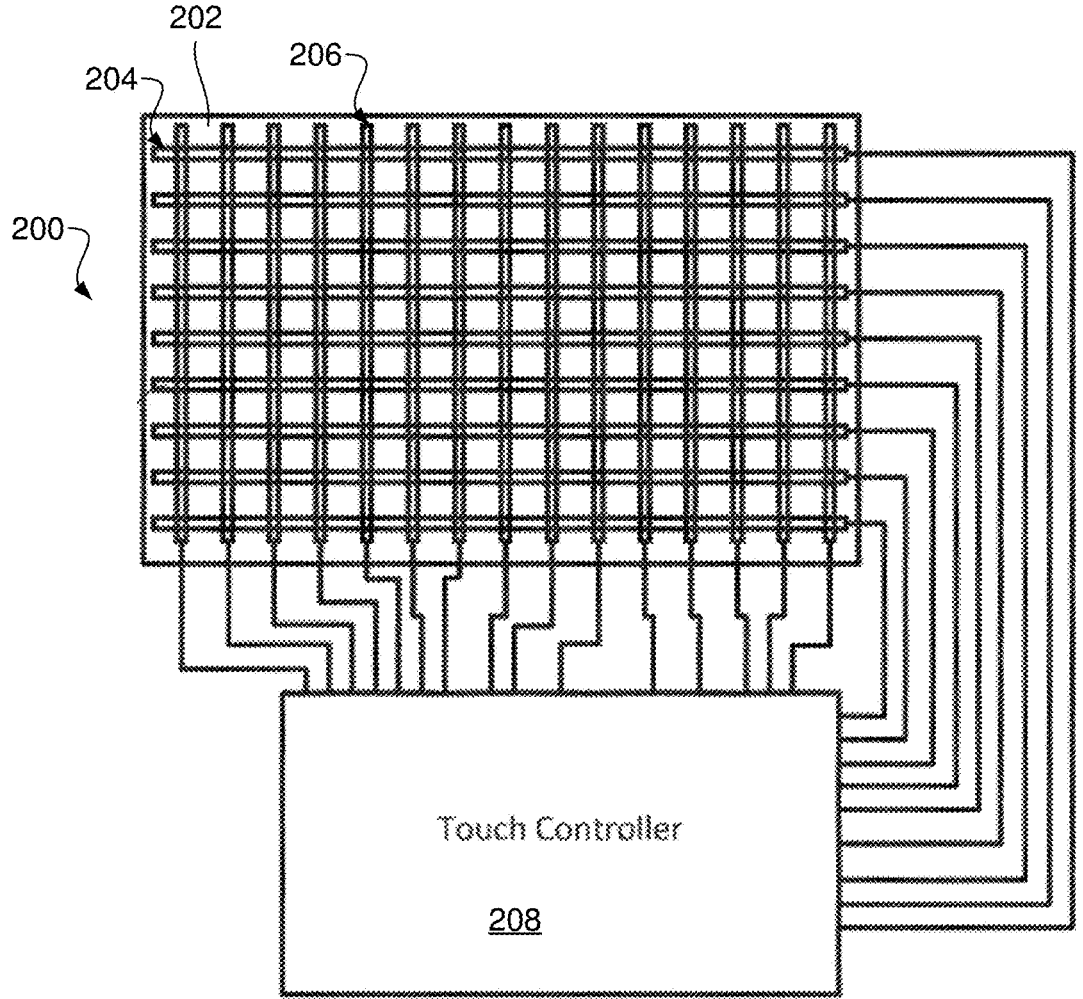
FIG. 2 depicts an example of a substrate with a first set of electrodes and a second set of electrodes in accordance with the disclosure.

FIG. 2 depicts an example of a portion of a capacitance module 200. In this example, the capacitance module 200 may include a substrate 202, first set 204 of electrodes, and a second set 206 of electrodes. The first and second sets 204,

206 of electrodes may be oriented to be transverse to each other. Further, the first and second sets 204, 206 of electrodes may be electrically isolated from one another so that the electrodes do not short to each other. However, where electrodes from the first set 204 overlap with electrodes from the second set 206, capacitance can be measured. The capacitance module 200 may include one or more electrodes in the first set 204 or the second set 206. Such a substrate 202 and electrode sets may be incorporated into a touch screen, a touch pad, a location sensor, a gaming controller, a button, and/or detection circuitry.

In some examples, the capacitance module 200 is a mutual capacitance sensing device. In such an example, the substrate 202 has a set 204 of row electrodes and a set 206 of column electrodes that define the touch/proximity-sensitive area of the component. In some cases, the component is configured as a rectangular grid of an appropriate number of electrodes (e.g., 8-by-6, 16-by-12, 9-by-15, or the like).

As shown in FIG. 2, the capacitance module 208 includes a capacitance controller 208. The capacitance controller 208 may include at least one of a central processing unit (CPU), a digital signal processor (DSP), an analog front end (AFE) including amplifiers, a peripheral interface controller (PIC), another type of microprocessor, and/or combinations thereof, and may be implemented as an integrated circuit, a field programmable gate array (FPGA), an application specific integrated circuit (ASIC), a combination of logic gate circuitry, other types of digital or analog electrical design components, or combinations thereof, with appropriate circuitry, hardware, firmware, and/or software to choose from available modes of operation.

In some cases, the capacitance controller 208 includes at least one multiplexing circuit to alternate which of the sets 204, 206 of electrodes are operating as drive electrodes and sense electrodes. The driving electrodes can be driven one at a time in sequence, or randomly, or drive multiple electrodes at the same time in encoded patterns. Other configurations are possible such as a self-capacitance mode where the electrodes are driven and sensed simultaneously. Electrodes may also be arranged in non-rectangular arrays, such as radial patterns, linear strings, or the like. A shield layer (see FIG. 3) may be provided beneath the electrodes to reduce noise or other interference. The shield may extend beyond the grid of electrodes. Other configurations are also possible.

In some cases, no fixed reference point is used for measurements. The touch controller 208 may generate signals that are sent directly to the first or second sets 204, 206 of electrodes in various patterns.

In some cases, the component does not depend upon an absolute capacitive measurement to determine the location of a finger (or stylus, pointer, or other object) on a surface of the capacitance module 200. The capacitance module 200 may measure an imbalance in electrical charge to the electrode functioning as a sense electrode which can, in some examples, be any of the electrodes designated in either set 204, 206 or, in other examples, with dedicated-sense electrodes. When no pointing object is on or near the capacitance module 200, the capacitance controller 208 may be in a balanced state, and there is no signal on the sense electrode. When a finger or other pointing object creates imbalance because of capacitive coupling, a change in capacitance may occur at the intersections between the sets of electrodes 204, 206 that make up the touch/proximity sensitive area. In some cases, the change in capacitance is measured. However, in alternative example, the absolute capacitance value may be measured.

While this example has been described with the capacitance module 200 having the flexibility of the switching the sets 204, 206 of electrodes between sense and transmit electrodes, in other examples, each set of electrodes is dedicated to either a transmit function or a sense function.

Figure 3:
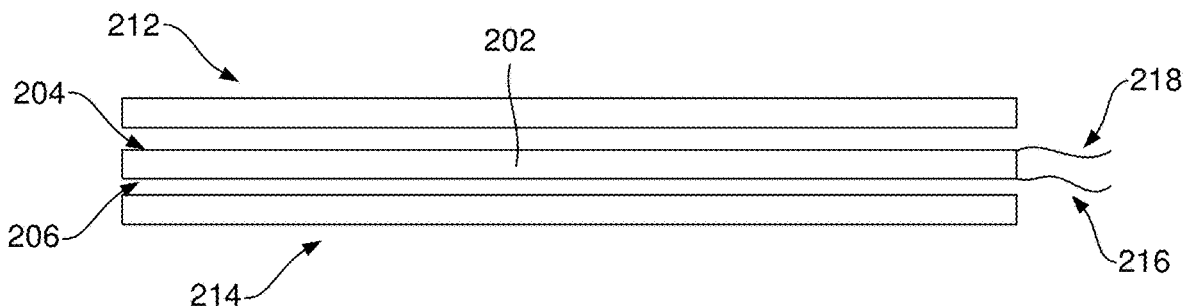
FIG. 3 depicts an example of a touch pad in accordance with the disclosure.

104 FIG. 3 depicts an example of a substrate 202 with a first set 204 of electrodes and a second set 206 of electrodes deposited on the substrate 202 that is incorporated into a capacitance module. The first set 204 of electrodes and the second set 206 of electrodes may be spaced apart from each other and electrically isolated from each other. In the example depicted in FIG. 3, the first set 204 of electrodes is deposited on a first side of the substrate 202, and the second set 206 of electrodes is deposited on the second side of the substrate 202, where the second side is opposite the first side and spaced apart by the thickness of the substrate 202. The substrate may be made of an electrically insulating material thereby preventing the first and second sets 204, 206 of electrodes from shorting to each other. As depicted in FIG. 2, the first set 204 of electrodes and the second set 206 of electrodes may be oriented transversely to one another. Capacitance measurements may be taken where the intersections with the electrodes from the first set 204 and the second set 206 overlap. In some examples, a voltage may be applied to the transmit electrodes and the voltage of a sense electrode that overlaps with the transmit electrode may be measured. The voltage from the sense electrode may be used to determine the capacitance at the intersection where the sense electrode overlaps with the transmit electrode.

In the example of FIG. 3 depicting a cross section of a capacitance module, the substrate 202 may be located between a capacitance reference surface 212 and a shield 214. The capacitance reference surface 212 may be a covering that is placed over the first side of the substrate 202 and that is at least partially transparent to electric fields. As a user's finger or stylus approach the capacitance reference surface 212, the presence of the finger or the stylus may affect the electric fields on the substrate 202. With the presence of the finger or the stylus, the voltage measured from the sense electrode may be different than when the finger or the stylus are not present. As a result, the change in capacitance may be measured.

The shield 214 may be an electrically conductive layer that shields electric noise from the internal components of the electronic device. This shield may prevent influence on the electric fields on the substrate 202. In some cases, the shield is solid piece of material that is electrically conductive. In other cases, the shield has a substrate and an electrically conductive material disposed on at least one substrate. In yet other examples, the shield is layer in the touch pad that performs a function and also shields the electrodes from electrically interfering noise. For example, in some examples, a pixel layer in display applications may form images that are visible through the capacitance reference surface, but also shields the electrodes from the electrical noise.

The voltage applied to the transmit electrodes may be carried through an electrical connection 216 from the touch controller 208 to the appropriate set of electrodes. The voltage applied to the sense electrode through the electric fields generated from the transmit electrode may be detected through the electrical connection 218 from the sense electrodes to the touch controller 208.

While the example of FIG. 3 has been depicted as having both sets of electrodes deposited on a substrate, one set of electrodes deposited on a first side and a second set of electrodes deposited on a second side; in other examples, each set of electrodes may be deposited on its own dedicated substrate.

Further, while the examples above describe a touch pad with a first set of electrodes and a second set of electrodes; in some examples, the capacitance module has a single set of electrodes. In such an example, the electrodes of the sensor layer may function as both the transmit and the receive electrodes. In some cases, a voltage may be applied to an electrode for a duration of time, which changes the capacitance surrounding the electrode. At the conclusion of the duration of time, the application of the voltage is discontinued. Then a voltage may be measured from the same electrode to determine the capacitance. If there is no object (e.g., finger, stylus, etc.) on or in the proximity of the capacitance reference surface, then the measured voltage off of the electrode after the voltage is discontinued may be at a value that is consistent with a baseline capacitance. However, if an object is touching or in proximity to the capacitance reference surface, then the measured voltage may indicate a change in capacitance from the baseline capacitance.

In some examples, the capacitance module has a first set of electrodes and a second set of electrodes and is communication with a controller that is set up to run both mutual capacitance measurements (e.g., using both the first set and the second set of electrodes to take a capacitance measurement) or self-capacitance measurements (e.g., using just one set of electrodes to take a capacitance measurement).

Figure 4:
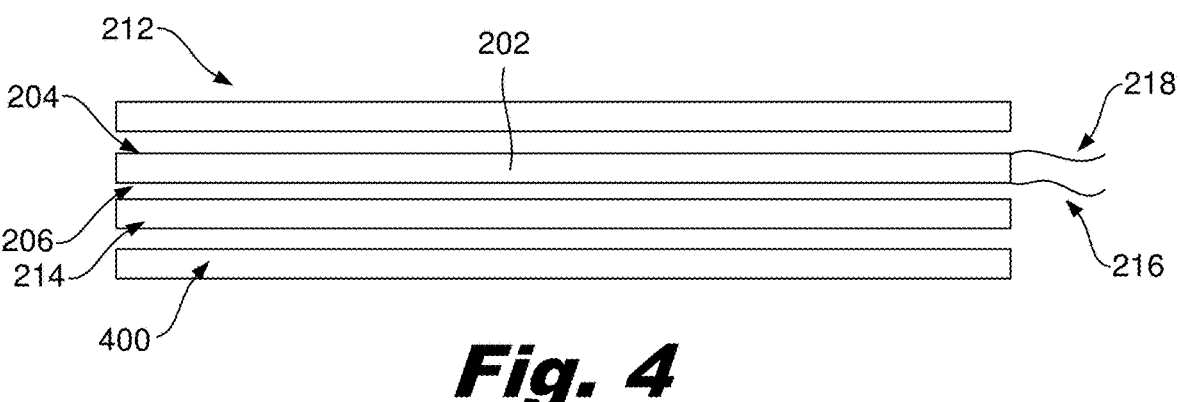
FIG. 4 depicts an example of a touch screen in accordance with the disclosure.

FIG. 4 depicts an example of a capacitance module incorporated into a touch screen. In this example, the substrate 202, sets of electrodes 204, 206, and electrical connections 216, 218 may be similar to the arrangement described in conjunction with FIG. 3. In the example of FIG. 4, the shield 214 is located between the substrate 202 and a display layer 400. The display layer 400 may be a layer of pixels or diodes that illuminate to generate an image. The display layer may be a liquid crystal display, a light emitting diode display, an organic light emitting diode display, an electroluminescent display, a quantum dot light emitting diode display, an incandescent filaments display, a vacuum florescent display, a cathode gas display, another type of display, or combinations thereof. In this example, the shield 214, the substrate 202, and the capacitance reference surface 212 may all be at least partially optically transparent to allow the image depicted in the display layer to be visible to the user through the capacitance reference surface 212. Such a touch screen may be included in a monitor, a display assembly, a laptop, a mobile phone, a mobile device, an electronic tablet, a dashboard, a display panel, an infotainment device, another type of electronic device, or combinations thereof.

Figure 5:
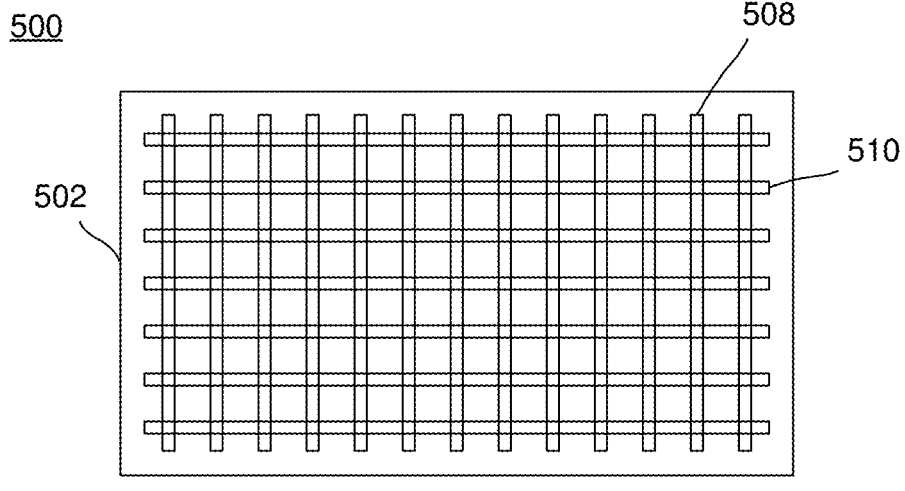
FIG. 5 depicts an example of a capacitance module in accordance with the disclosure.
Figure 5:
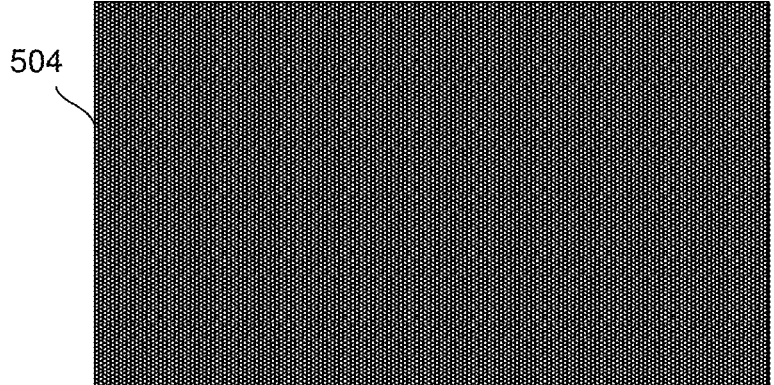
Figure 5:
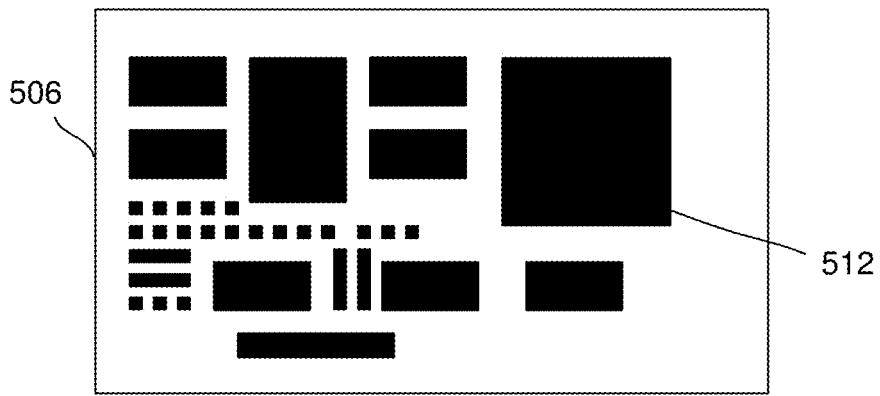

FIG. 5 depicts an example of a capacitance module 500. In this example, the capacitance module 500 is a stack of three layers, including a sensor layer 502, a shield layer 504, and a component layer 506. While the capacitance module 500 in this example includes three layers, in other examples, a capacitance module may include a different number of layers. For example, a capacitance module may include four layers, five layers, or a different number of layers.

The sensor layer 502 may include a first set 508 of electrodes and a second set 510 of electrodes which may be used in a capacitance circuit to detect and/or measure changes in capacitance. While this example depicts a sensor layer 502 with two sets of electrodes, in other examples, a sensor layer may include one set of electrodes, three sets of electrodes, or a different number of sets of electrodes. While this example depicts a single sensor layer 502, in other examples a capacitance module may include more than one sensor layer.

The first set 508 of electrodes and the second set 510 of electrodes may operate using mutual capacitance, self-capacitance, or combinations thereof. In examples where a sensor layer includes a single set of electrodes, the single set of electrodes may operate using self-capacitance. In other examples, the first and second sets of electrodes are located on different layers.

The shield layer 504 is located adjacent to the sensor layer 502 within the capacitance module 500. In other examples, a shield layer may be in another location relative to other layers in the stack.

The shield layer 504 may include a material which blocks or reduces electromagnetic and/or electrical interference. In some examples, a shield layer may be made of a conductive material such as copper, aluminum, silver, or combinations thereof. In other examples, a shield layer may be a composite material such as plastic, glass, another composite structure, or combinations thereof. In yet other examples, a shield layer may be a shielding material coating applied to a substrate, such as indium tin oxide (ITO), graphene, a conductive polymer, another coating, or combinations thereof. In some cases, a shield layer's material may be a magnetic material, such as iron, ferrite, another metal, composites thereof, alloys thereof, mixtures thereof, or combinations thereof.

In this example, the shield layer 504 is located between the sensor layer 502 and the component layer 506. The shield layer 504 may help prevent electromagnetic interference originating from components 518 on the component layer 506 or sources external to the capacitance module from interfering with the first set 508 and/or second set 510 of electrodes on the sensor layer 502.

Shielding the sensor layer 502 with the shield layer 504 may improve the accuracy and stability of capacitance measurements measured by first set 508 and second set 501 of electrodes. Shielding the sensor layer 502 may also reduce noise, which may increase the sensitivity and accuracy of user inputs on the capacitance module 500. The shield layer 504 may be positioned to block interference from a battery, power sources, memory resources, processing resources, electronic components, other components, or combinations thereof that may be positioned within a cavity of the electronic device.

In this example, the component layer 506 is adjacent to the shield layer 504. In other examples, a component layer may be in another location relative to other layers in a stack or parts of a capacitance module. The component layer 506 includes components 512.

The component layer 506 may include components 512 which facilitate the functionality of the capacitance module 500. Components on a component layer may include a central processing unit (CPU), a microcontroller, an op-amp, a memory unit, a field-programmable gate array (FPGA), a graphics processing unit (GPU), an interface controller, a power management integrated circuit, processing resources, an antenna, another type of component, or combinations thereof.

Figure 6:
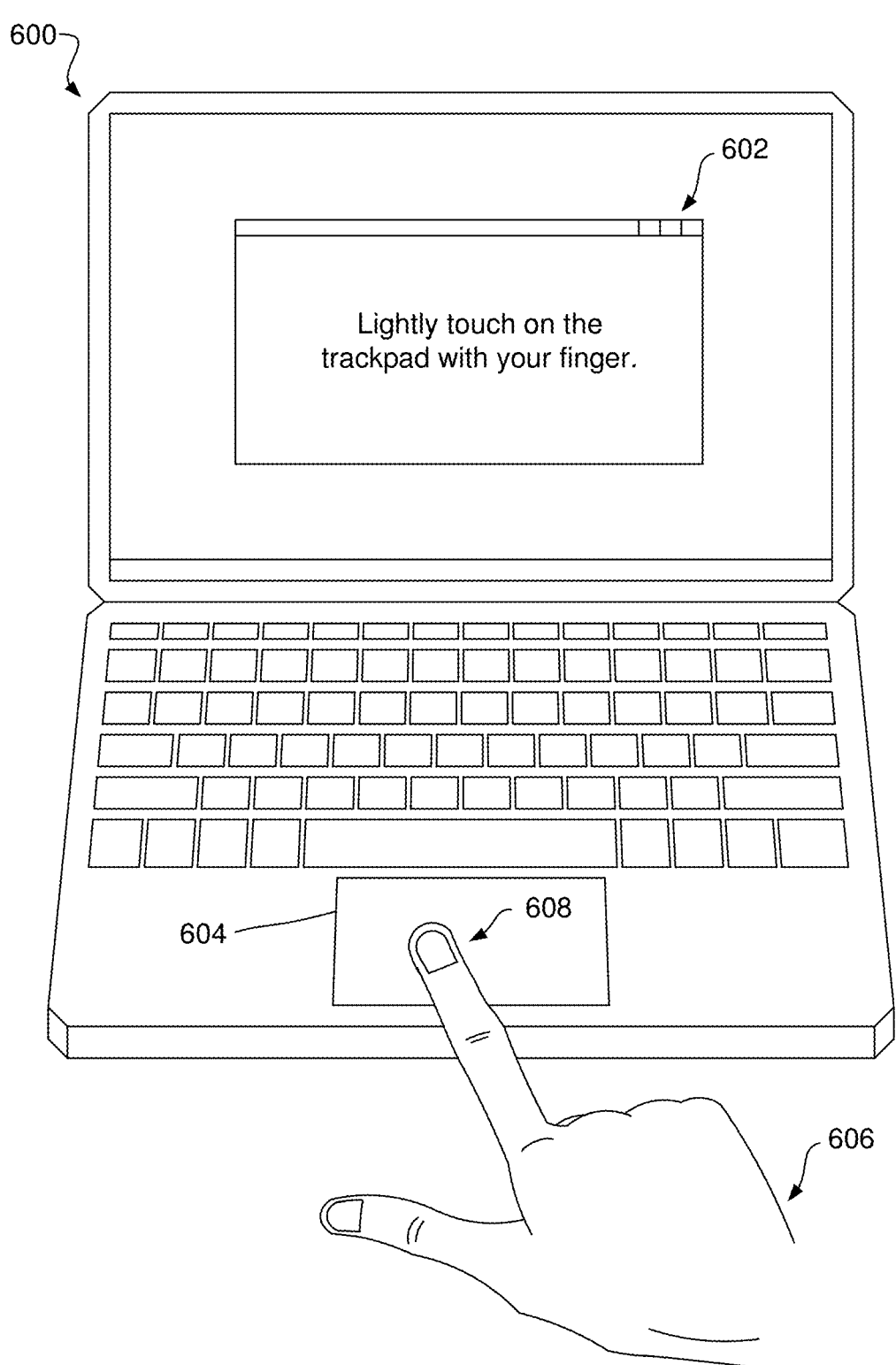
FIG. 6 depicts an example of an electronic device in accordance with the disclosure.

FIG. 6 depicts an example of an electronic device 600 in accordance with the disclosure. In this example, the electronic device 600 is a laptop, but any other electronic device may be used in accordance with the principles of this disclosure. The electronic device 600 includes an input device 604 that includes the capacitance module. However, in other electronic devices, the input device may include an inductive input device, a resistance input device, another type of input device, or combinations thereof.

During a calibration process, the electronic device 600 may communicate a prompt 602 for user input to a user 606. In this example, the prompt 602 may be communicated to the user 606 by displaying the prompt on the display of the electronic device 600. The prompt 602 may instruct the user to lightly touch the trackpad with their finger. In other examples, a prompt may be communicated differently, such as through audio, haptic feedback, lights, a text message, another mechanism, or combinations thereof.

Upon receiving the prompt 602, the user 606 may provide an input 608 to the input device 604. The input 608 may correspond to the prompt 602. In this example, the input 608 may be a light touch input corresponding to the prompt 602 to lightly touch the trackpad with a finger. During the calibration process, the user 606 may also be prompted to provide a firmer press input in which they press more firmly on the input device by applying more pressure than during a touch input prompt. The user 606 may be directed to provide the prompted input at a certain location on the input device 604. In some examples, a user may be prompted to provide the same type of input at different locations or orientations.

In the depicted example, the input 608 may be a solitary input. In other examples, an input may be a gesture input or combination of gesture inputs. For example, a user may be prompted to provide a proximity input in which they place a finger or other input method near a capacitance module without making physical contact with a reference surface. In yet other examples, a user may be prompted to provide a combination of inputs, such as a touch inputs, press inputs, and proximity inputs in sequence. Other combinations of gestures and prompts also exist.

As the user 606 provides the input 608, the input device 604 may record sensor measurements corresponding to the input. The sensor measurements may be capacitance measurements. The measurements may include the input's contact area in contact with the input device, the input's capacitance signal strength, the rate of change of the capacitance signal over time, and/or the duration of contact between the input and the reference surface of the input device 604.

The measurements of the user input 608 during the calibration process may be processed and stored in memory resources of the capacitance module. These measurements may form a reference dataset for the corresponding input type (e.g., touch input or press input).

In some cases, the raw data from the user input 608 may be stored as attributes. In other examples, the attributes may include processed data. In some examples, the processed attributes may include average lengths, median lengths, maximum lengths, minimum lengths, lengths within the first standard of deviation, average widths, median widths, maximum widths, minimum widths, widths within the first standard of deviation, average contact areas, median contact areas, maximum contact areas, minimum contact areas, contact areas within the first standard of deviation, average capacitance signal strengths, median capacitance signal strengths, maximum capacitance signal strengths, minimum capacitance signal strengths, capacitance signal strengths within the first standard of deviation, average sizes, median sizes, maximum sizes, minimum sizes, sizes within the first standard of deviation, other processed attributes, or combinations thereof. In some cases, both raw and processed attributes may be stored and/or used to compare against unprompted user inputs.

After a prompt, user input, and recording of measurements, the calibration process may repeat these steps to collect reference datasets for multiple types of inputs. Collecting datasets may allow the input device 604 to establish baseline attributes that characterize and distinguish pressures of corresponding inputs.

During operation of the electronic device 600, the input device 604 may classify unprompted capacitive inputs by comparing their measured attributes to the reference datasets stored in memory. If an input's attributes closely match attributes in a reference dataset, the pressure of the input may be classified accordingly. For example, if an input's attributes closely match attributes associated with touch inputs, the input pressure may be classified as the pressure of a touch input. In another example, if an input's attributes more closely match attributes associated with press inputs, the input pressure may be classified as the pressure of a press input.

This calibration process of prompting, measuring, storing, and comparing inputs may allow the input device 604 to reliably determine the pressure level of subsequent unprompted inputs and differentiate between various inputs on the input device.

A capacitance module may reliably determine the pressure of user inputs based on reference capacitance sensor data, even without the inclusion of a dedicated pressure sensor in the capacitance module. This process may enable capacitance modules to omit the inclusion of dedicated pressure sensors while still providing pressure information of inputs, which may reduce the cost and manufacturing complexity of a capacitance module.

Figure 7:
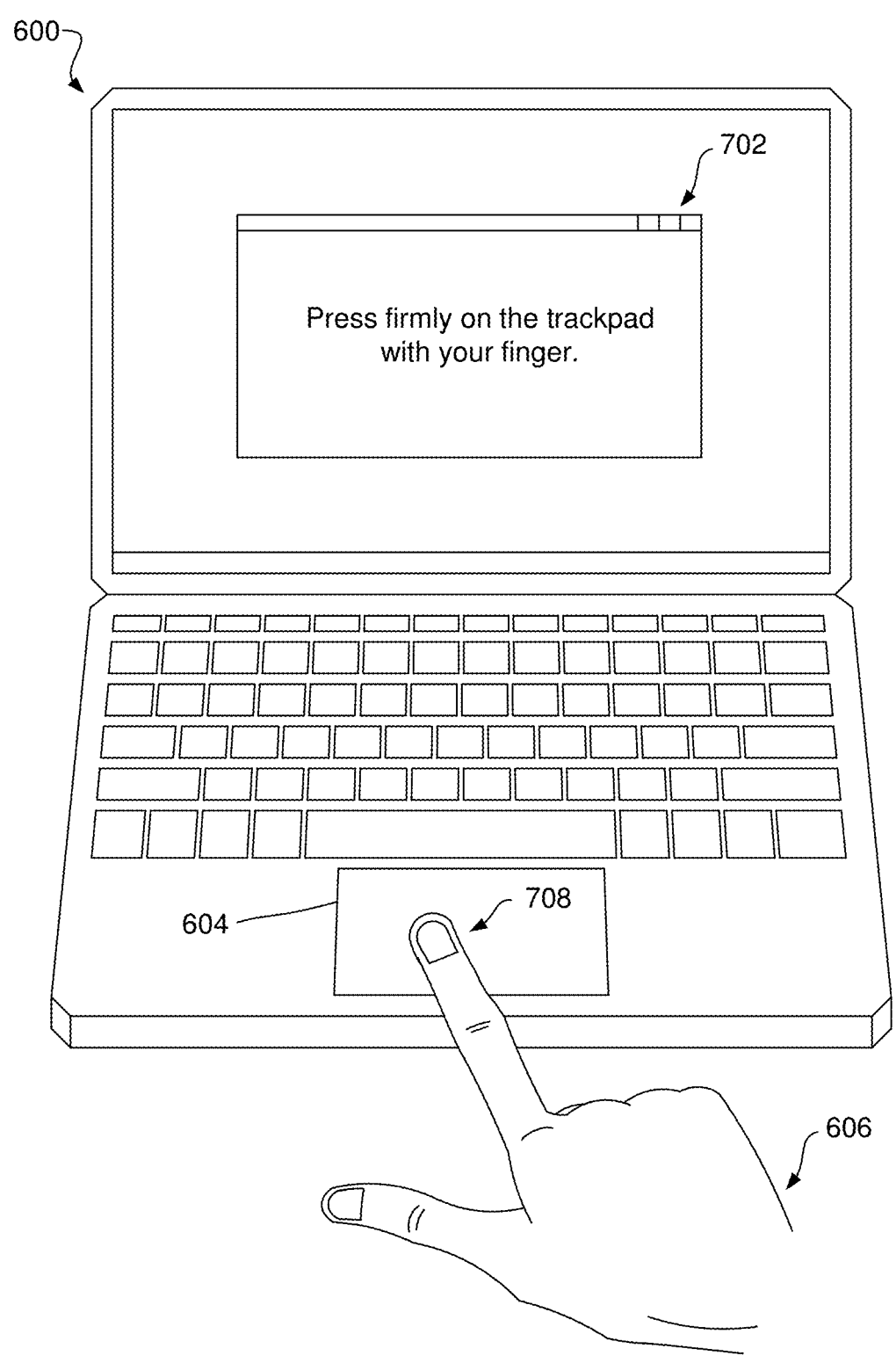
FIG. 7 depicts an example of an electronic device in accordance with the disclosure.

FIG. 7 depicts an example of the electronic device 600 displaying a prompt 702 for the user 606 to press firmly on the input device 604 with a finger during a calibration process. As a press input 708 is provided, the input device 604 may measure capacitance values associated with the input, form a reference dataset, and store the dataset in memory resources. During operation of the electronic device 600, unprompted capacitance inputs to the input device 604 may be classified by comparing measurements of the current input to the reference dataset stored in memory.

Figure 8A:
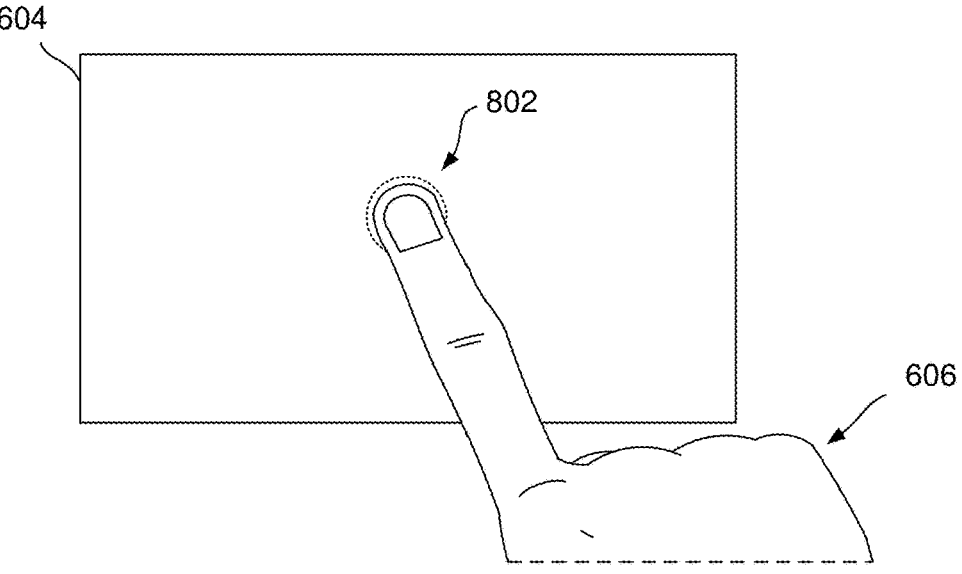
FIG. 8a depicts an example of a touch input in accordance with the disclosure.

FIG. 8a depicts an example of a touch input 802 in accordance with the disclosure. During a calibration process, a user 606 may be prompted to provide a touch input 802 which involves lightly touching the surface of the input device 604 with a finger.

Figure 8B:
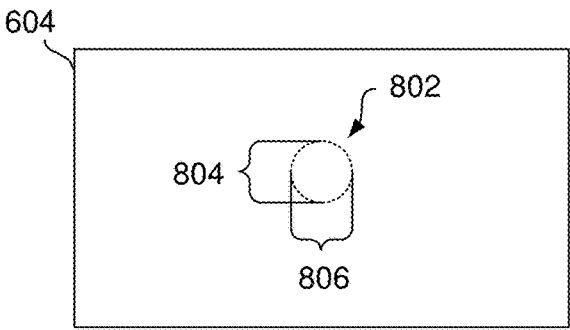
FIG. 8b depicts an example of a touch input in accordance with the disclosure.

FIG. 8b depicts an example of the touch input 802 in accordance with the disclosure. The input device 604 may measure a length 804 and width 806 of the touch input 802 contact on the surface of the input device. The length 804 and width 806 of the touch input 802 may be used to calculate a surface area of the touch input in contact with the surface of the input device 604. Measuring a length, width, or surface area may be done by analyzing the region of the capacitive sensor grid that detects a change in capacitance above a certain threshold, indicating the presence of a finger. The pixels or sensor elements contained within this region may provide an estimate of the touch contact area.

Additionally, the input device 604 may measure the capacitance signal strength associated with the touch input 802. The capacitance signal strength may reflect the change in mutual or self-capacitance measured by the sensing electrodes at the location of the touch input. A light touch typically results in a smaller change in capacitance compared to a firmer press input. The capacitance sensing circuitry may convert this analog capacitance change into a digital signal strength value.

Figure 8C:
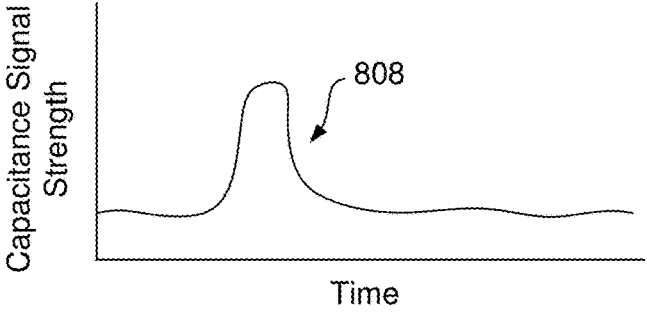
FIG. 8c depicts an example of a signal graph in accordance with the disclosure.

FIG. 8c depicts an example of a signal graph in accordance with the disclosure. In this example, the signal graph plots a capacitance signal strength 808 associated with the touch input 802 over time. The signal strength remains relatively constant while the finger is held steadily on the surface of the input device 604. The duration of the touch input 802 may also be captured from the temporal extent of the signal 808. These various attributes—contact area, signal strength, duration, rate of change, etc.—may be captured and stored in a reference dataset for touch inputs.

In some cases, the rate of change in signal strength, in contact area size, contact areas shape, in capacitance measurements, or other time-dependent factors may be useful for determining a pressure attribute. In some cases, just time-dependent rate-of-change attributes are collected and/or analyzed. In other examples, time-dependent rate-of-change attributes and non-rate-of-change attributes are collected as pressure attributes.

Figure 9A:
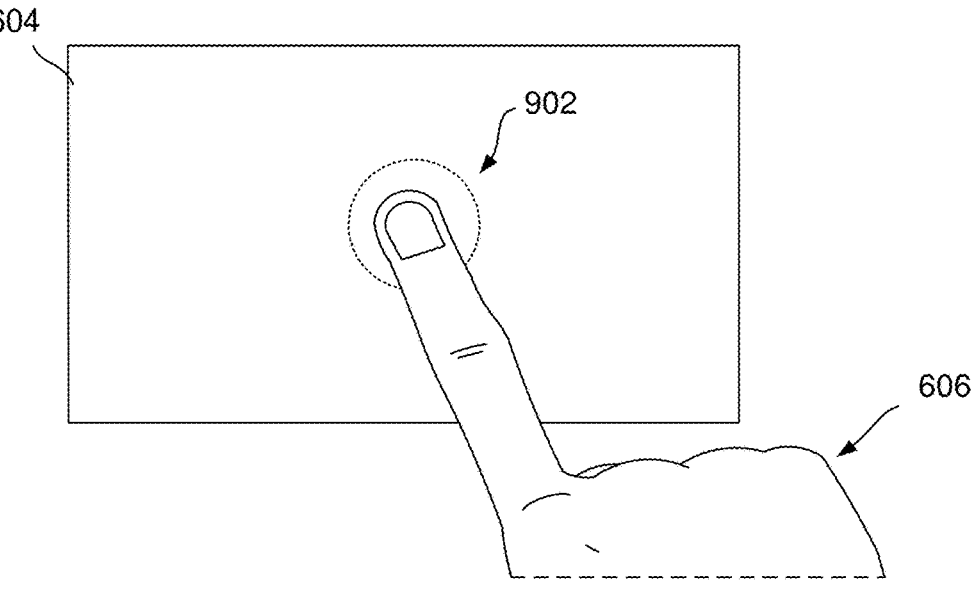
FIG. 9a depicts an example of a press input in accordance with the disclosure.

FIG. 9a depicts an example of a press input 902 on the input device 604. During the calibration process, the user 606 may be prompted to press the surface of the input device 604 to provide a distinct input from a touch input.

Figure 9B:
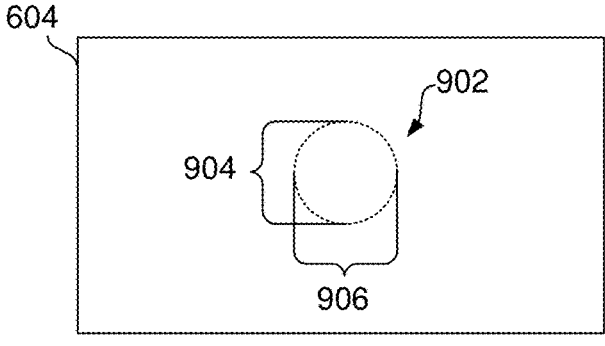
FIG. 9b depicts an example of a press input in accordance with the disclosure.

FIG. 9b depicts an example of the press input 902. Similar to the touch input 802, a length 904 and width 906 of the press input 902 may be estimated from the extent of the capacitive sensing region that is activated. The length 904 and width 906 of the press input 902 may be used to calculate a contact area of the input.

The press input 902 may have a larger contact area compared to the contact area of the touch input 802. During the press input 902, a finger may flatten out more than during a touch input, providing greater contact with the surface of the input device 604 than during a touch input.

The capacitance signal strength associated with the press input 902 may be measured by the input device 604. A press input may provide a greater capacitance signal strength than a capacitance signal strength provided by a lighter touch input. A press input may bring the finger closer to the sensing electrodes and deform the skin to create a larger effective contact area, resulting in a stronger change in the mutual or self-capacitance of the capacitance module. Therefore, the capacitance signal strength for a press input may be expected to be higher than that of a touch input.

Figure 9C:
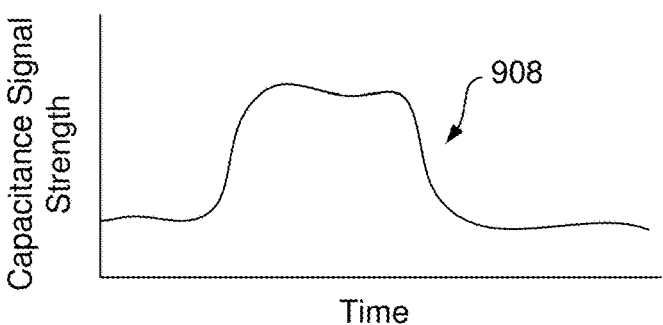
FIG. 9c depicts an example of a signal graph in accordance with the disclosure.

FIG. 9c depicts an example of a signal graph in accordance with the disclosure. In this example, the signal graph plots a capacitance signal strength 908 associated with the press input 902 over time. The signal strength remains relatively constant while the finger is held steadily on the surface of the input device 604. The duration of the press input 904 may also be captured from the temporal extent of the signal 908. These various attributes—contact area, signal strength, duration, rate of change, etc.—may be captured and stored in a reference dataset for touch inputs.

Different users may apply different amounts of pressure during a press input than other users. Likewise, users may apply different amounts of pressure during touch inputs than other users. Similarly, the difference in pressure between a press input and a touch input may vary from user to user. In some cases, the capacitance strength value threshold to be a touch input for one user may be higher than the capacitance strength value threshold for a press input for another user. Thus, the stored attributes of signal strength, contact area, duration, etc. may be different for each user.

Figure 10A:
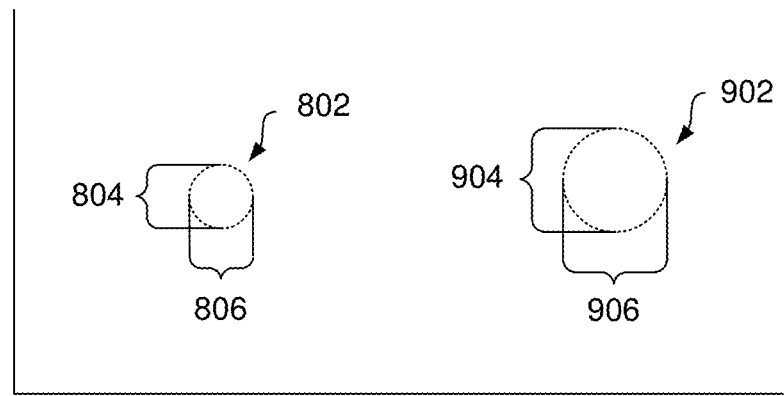
FIG. 10a depicts an example of inputs in accordance with the disclosure.

FIG. 10a depicts an example of the touch input 802 and the press input 902 in accordance with the disclosure. In this example, the touch input 802 and press input 902 are juxtaposed. The difference in magnitude between the two profiles may be used to distinguish the two input types. A capacitance value threshold, derived from calibration data, may be set to classify an input as a touch input or a press input based on its capacitance signal strength. More sophisticated models may also be trained on a larger corpus of labeled calibration data.

In this example, the length 804 and width 806 of the contact area of touch input 802 are smaller compared to the length 904 and width 906 of the contact area of the press input 902. The lengths and widths of the inputs may be used to determine the contacts area of inputs in contact with an input device surface. In some examples, a diagonal measurement of the contact area, a length of a perimeter or a section of a perimeter of the contact area, a shape of the contact area, multiple cross sections of the contact area, and so forth may be used to determine the differences between touch inputs and press inputs specific to a user. During normal operation of an input device, the characteristics of inputs may be compared to characteristics of reference inputs to determine pressure associated with the actual inputs.

Figure 10B:
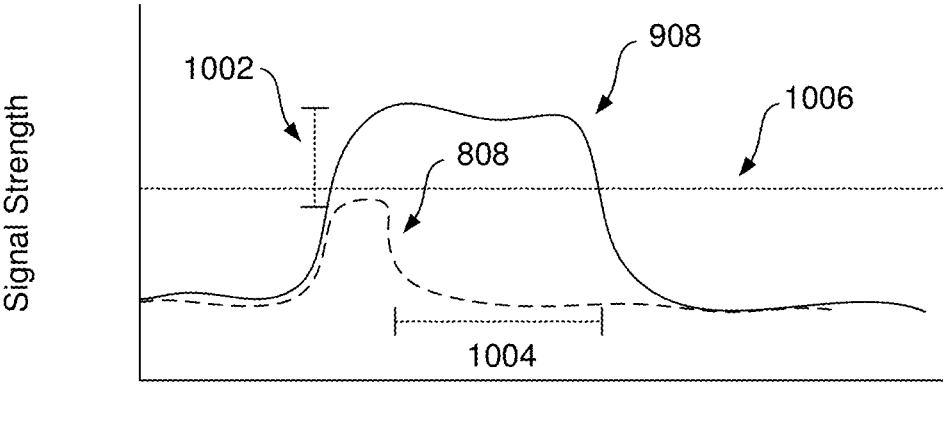
FIG. 10b depicts an example of a signal graph in accordance with the disclosure.

FIG. 10b depicts an example of a signal graph in accordance with the disclosure. In this example, the capacitance signal strength 808 of the touch input 802 is juxtaposed with the capacitance signal strength 908 of the press input 902. The two signals may have a difference 1002 in maximum magnitude. The two signals may have a difference 1004 in temporal duration. The differences 1002, 1004 illustrate the different characteristics of inputs of different types. Such differences may be used to differentiate between inputs in real-time operation of an input device as real-time input characteristics are compared to characteristics captured during a calibration phase. A press threshold value represented by line 1006 may be derived from the calibration data. This threshold may be adjusted as the calibration data is updated and/or refined over time.

Figure 11:
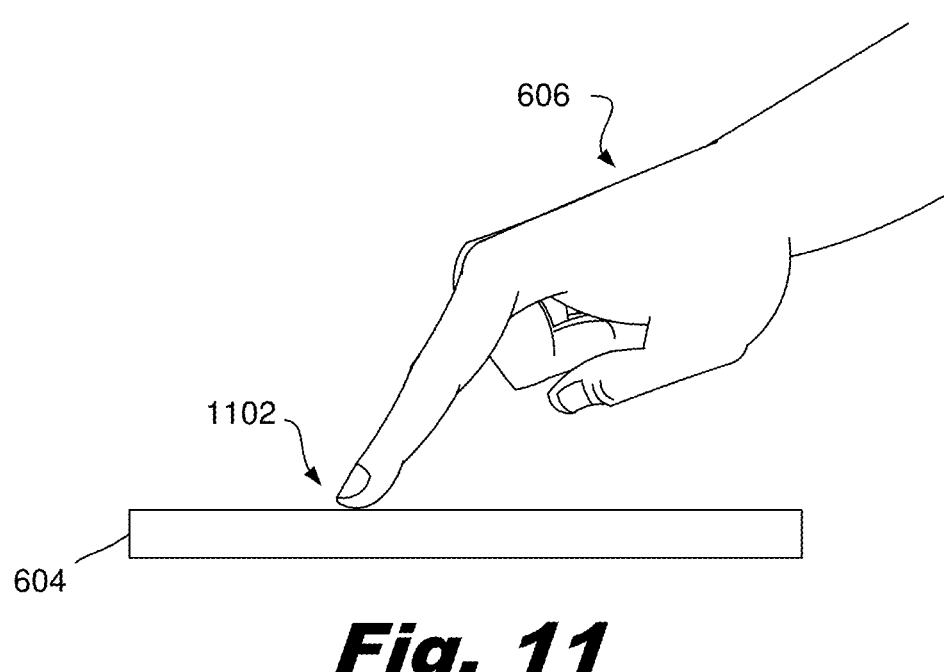
FIG. 11 depicts an example of a capacitance input in accordance with the disclosure.
Figure 12:
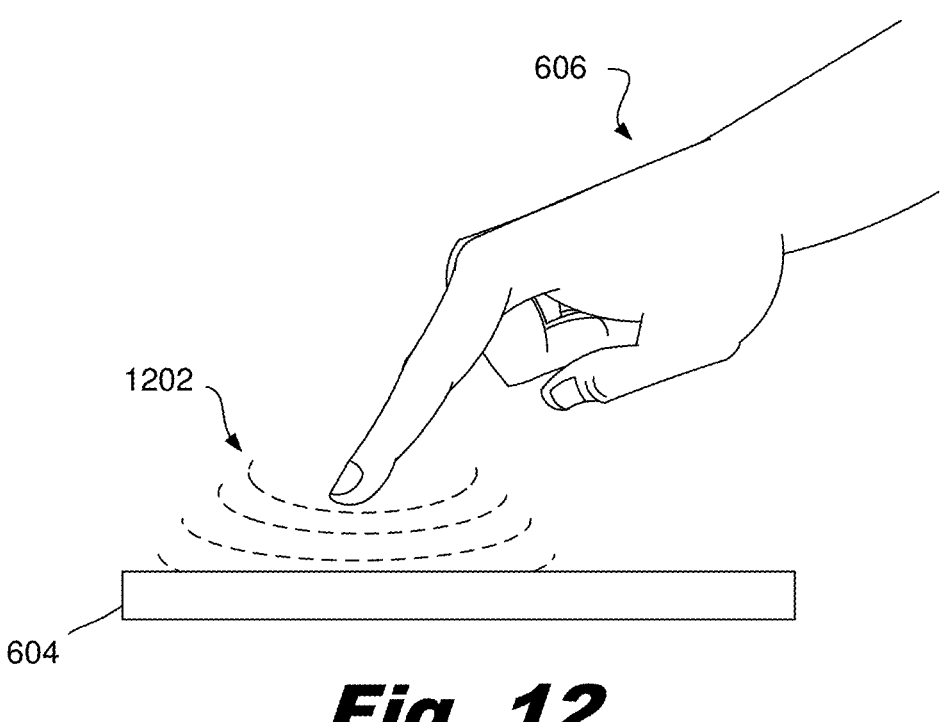
FIG. 12 depicts an example of a capacitance input in accordance with the disclosure.

FIG. 11 depicts an example of the user 606 providing a physical input 1102 to the input device 604. FIG. 12 depicts an example of the user 606 providing a proximity input 1202 to the input device 604.

A physical input 1102 may involve the user 606 directly touching the reference surface of the input device 604, allowing the capacitance module to measure attributes such as the capacitance value, length, width, and surface area of the user's finger making contact. The proximity input 1202 may involve the user 606 hovering a finger near the reference surface of the input device 606 without making direct contact, allowing the capacitance module to measure the capacitance changes associated with the finger's presence in proximity to the reference surface.

During a calibration process, capturing both proximity and physical touch inputs may be beneficial for several reasons. Measuring the capacitance data for physical touches may ensure that the system has an accurate profile of the user's direct interaction with an input device, including the precise capacitance values generated when their finger makes full contact with the surface. This direct touch data may form a core reference for distinguishing between touch inputs and press inputs.

Capturing proximity data may provide additional nuance and context to a calibration. By classifying the rate of capacitance change as a user's finger approaches and departs from a reference surface, the system may create a more complete model of the user's interaction. Proximity data may be particularly relevant for advanced interaction techniques that depend on tracking the finger's position above the trackpad.

Proximity data may also help refine pressure classification thresholds by providing a baseline for a user's typical hover distance and approach velocity. For example, if a user tends to hold their fingers very close to the input device when not actively touching, the system may set a higher threshold for registering an input pressure. Conversely, if a user makes fast, darting touches, the system may lower its threshold for input pressure to ensure it accounts for brief contacts. Incorporating proximity data into a calibration process may allow the system to adapt to these user-specific patterns.

Combining proximity and physical touch data may support more sophisticated pressure inference models. While the core distinction between a touch input and a press input may be established from physical touch data alone, the addition of proximity information may allow for finer-grained estimation. The rate and curve of capacitance change leading up to the moment of physical contact may provide an indication of the speed and force with which the finger strikes the reference surface, which in turn correlates with the ultimate pressure of the touch.

A machine learning model may be trained on many examples of these combined proximity-to-touch sequences, learning to predict the ultimate touch pressure from the preceding approach curve. This may enable a quasi-continuous pressure estimation, rather than a mere binary touch/press classification.

Figure 13A:
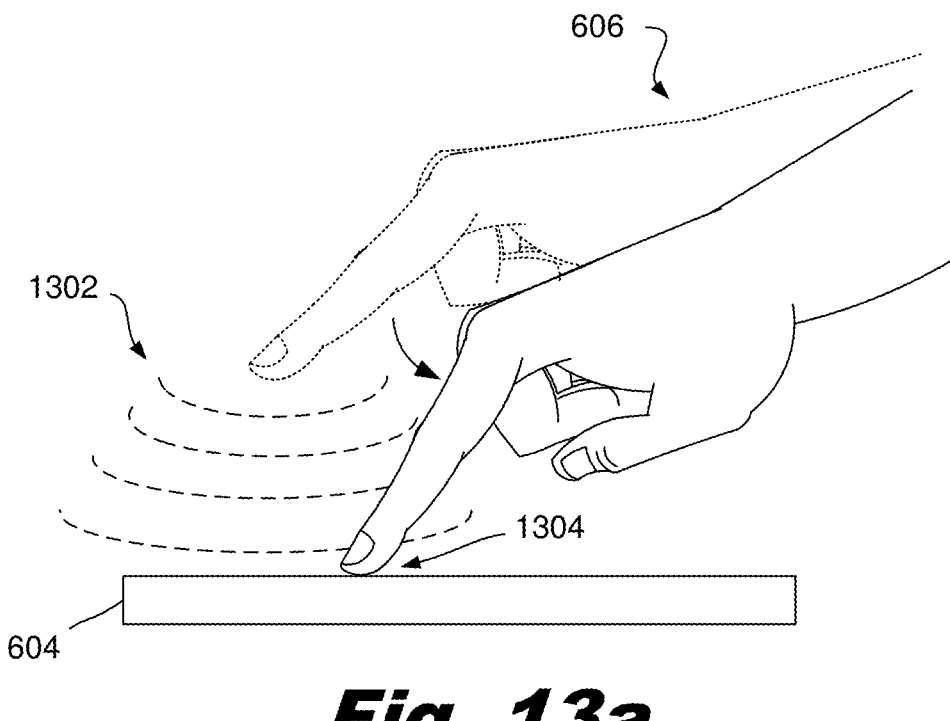
FIG. 13a depicts an example of a capacitance input in accordance with the disclosure.

FIG. 13a depicts an example of a capacitance input in accordance with the disclosure. In this example, the user 606 makes a continuous motion input, which may be interpreted as a proximity input 1302 followed by a physical input 1304 on the reference surface of the input device 604. The capacitive sensors in the input device 604 may measure the interaction as a progressive change in capacitance, as shown in FIG. 13b.

Figure 13B:
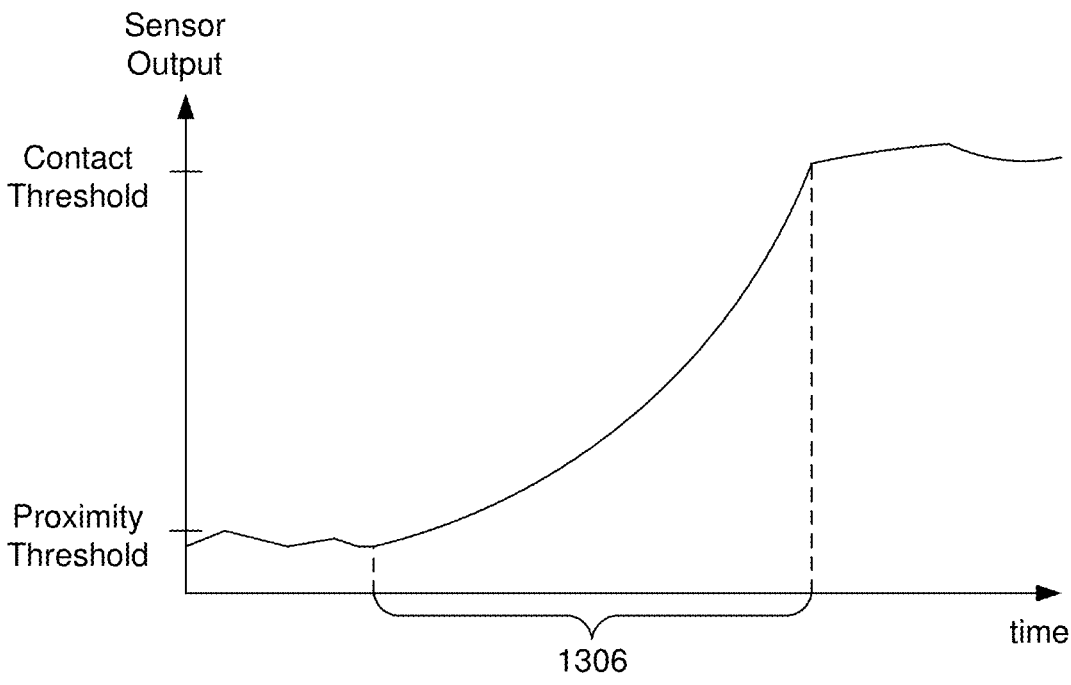
FIG. 13b depicts an example of a signal graph in accordance with the disclosure.

FIG. 13b depicts a signal graph in accordance with the disclosure. In this example, the sensed capacitance signal strength is plotted against time on the horizontal axis. Two key thresholds are marked: the proximity threshold, which indicates the minimum signal strength at which the system can reliably detect the presence of a finger near the reference surface, and the contact threshold, which indicates the signal strength at which the finger makes physical contact with the surface.

As the user's 606 finger approaches the reference surface of the input device 604, the sensed signal strength increases, crossing the proximity threshold at a first time. This moment corresponds to the proximity input 1302 depicted in FIG. 13a. As the finger continues to descend, the signal strength rises before crossing the contact threshold at a second time. This moment may correspond to the physical input 1304 depicted in FIG. 13a. The difference between the first time and the second time is represented by the difference 1306.

The specific shape of the capacitance curve associated with the difference 1306 may correspond to an approach style of the user 606. A steeper, faster rise may suggest a quicker, harder approach. A gradual rise may suggest a slower, softer approach. The ultimate height of the curve after the second time may correspond to the pressure of the touch itself. A higher plateau may suggest a firmer press, while a lower level may suggest a softer touch.

During the calibration process, the input device 604 may record many instances of these proximity-to-touch curves as the user performs a series of prompted touches and presses. The resulting dataset may capture the user's 606 approach signatures and the associated touch pressures. The dataset may be used to train a predictive model, which may estimate the touch pressure based, at least in part, on the preceding proximity curve.

While the input device 604 is in normal use (post-calibration), each new input on the device may be classified by comparing its proximity-to-touch curve to the learned model. The system may first detect when the capacitance signal strength crosses the proximity threshold, then may track the rising curve, finally noting the pressure level after contact. This sequence may be fed into the trained model, which returns an estimated pressure classification. The model may output a binary touch input vs press input distinction or a more continuous pressure score, depending on the granularity of the training data and the complexity of the model.

By leveraging both proximity and contact data in this way, the input device 604 may achieve more nuanced and precise pressure sensing compared to using contact data alone. The system may learn to interpret not just absolute capacitance levels, but also the dynamics of the user's finger approach to holistically characterize their interaction. This may enable more personalized and context-aware pressure classification, ultimately offering a more responsive and intuitive user experience.

Figure 14:
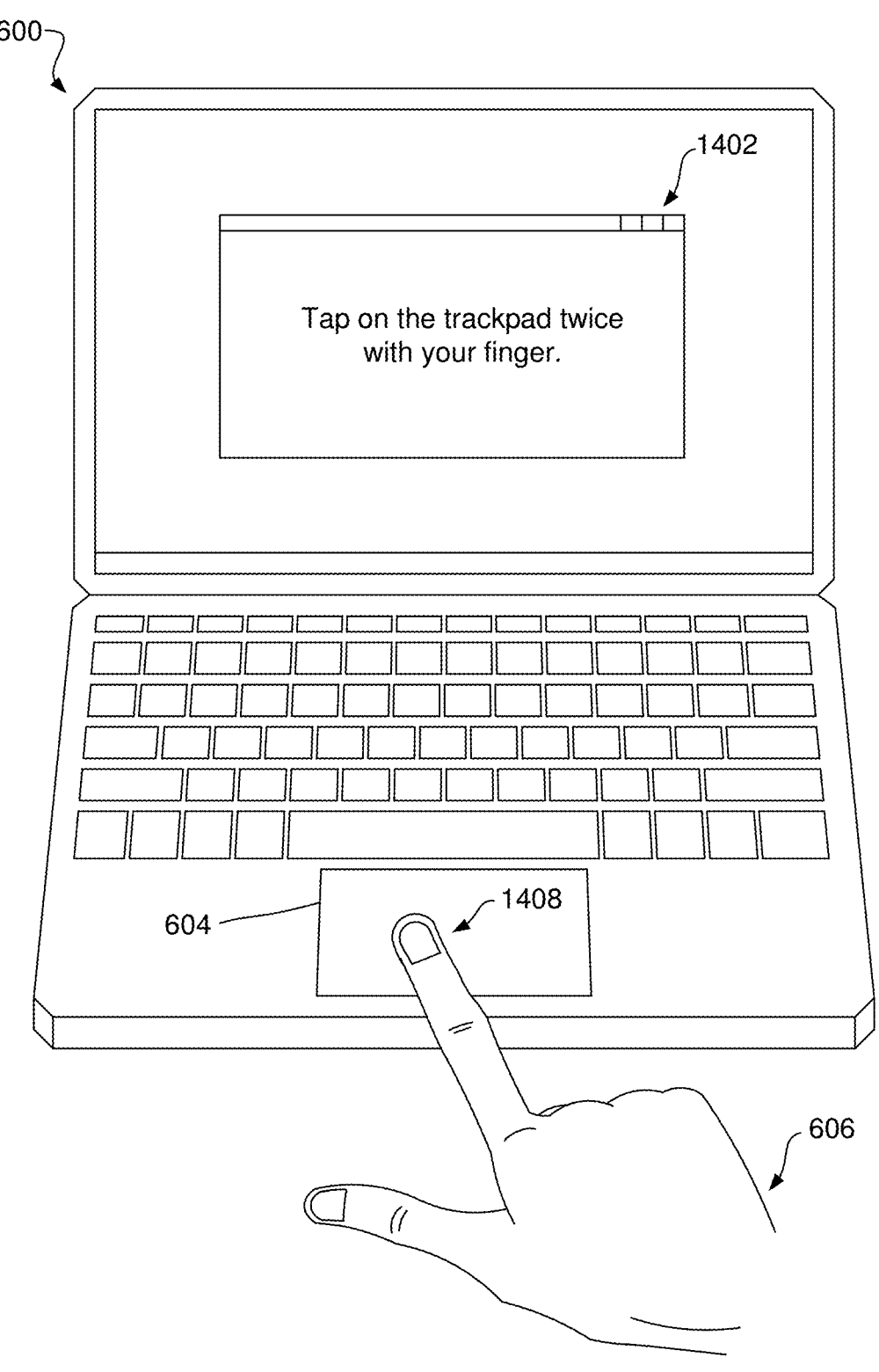
FIG. 14 depicts an example of an electronic device in accordance with the disclosure.

FIG. 14 depicts an example of the electronic device 600 displaying a prompt 1402 to the user 606 to perform a double tap on the input device 604 during a calibration process. As a double tap input 1408 is provided, the input device 604 may measure capacitance values associated with the input, form a reference dataset, and store the dataset in memory resources. A double tap prompt and double tap input may help the system distinguish between single presses and double taps, which may have distinct pressure profiles. The rapid sequence of touches in a double tap may exhibit a characteristic temporal capacitance pattern that the classification algorithms of the input device 604 may be trained to recognize.

Figure 15:
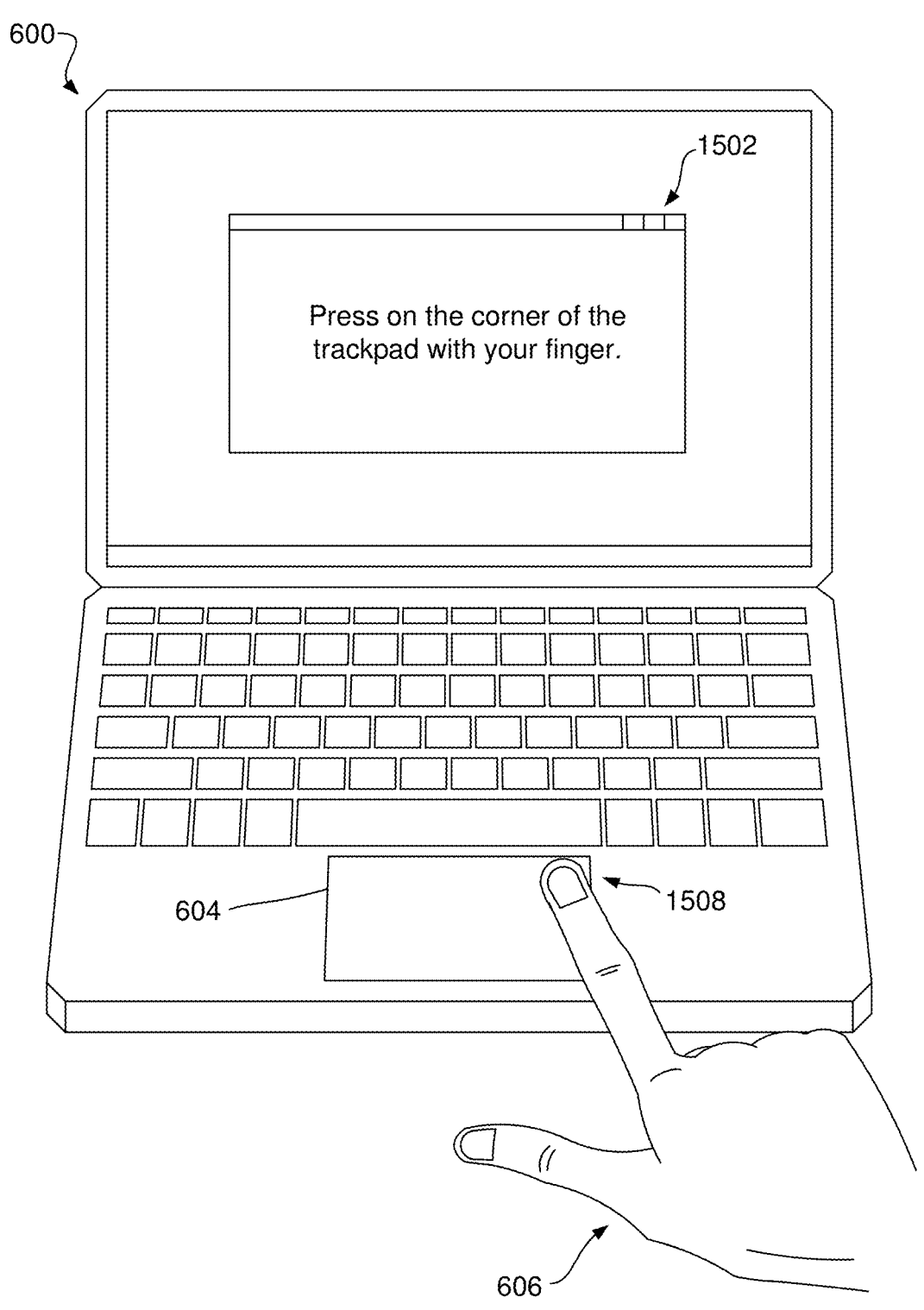
FIG. 15 depicts an example of an electronic device in accordance with the disclosure.

FIG. 15 depicts an example of the electronic device 600 displaying a prompt 1502 to the user 606 to perform a corner press on the input device 604 during a calibration process. As a corner press input 1508 is provided, the input device 604 may measure capacitance values associated with the input, form a reference dataset, and store the dataset in memory resources. A corner press input may exhibit a different capacitance signal from presses in the central area of the input device 604 surface due to the reduced electrode density and mechanical support in the corners. Capturing corner press data may allow the system to create location-specific pressure models and algorithms for more accurate pressure classification of inputs.

Figure 16:
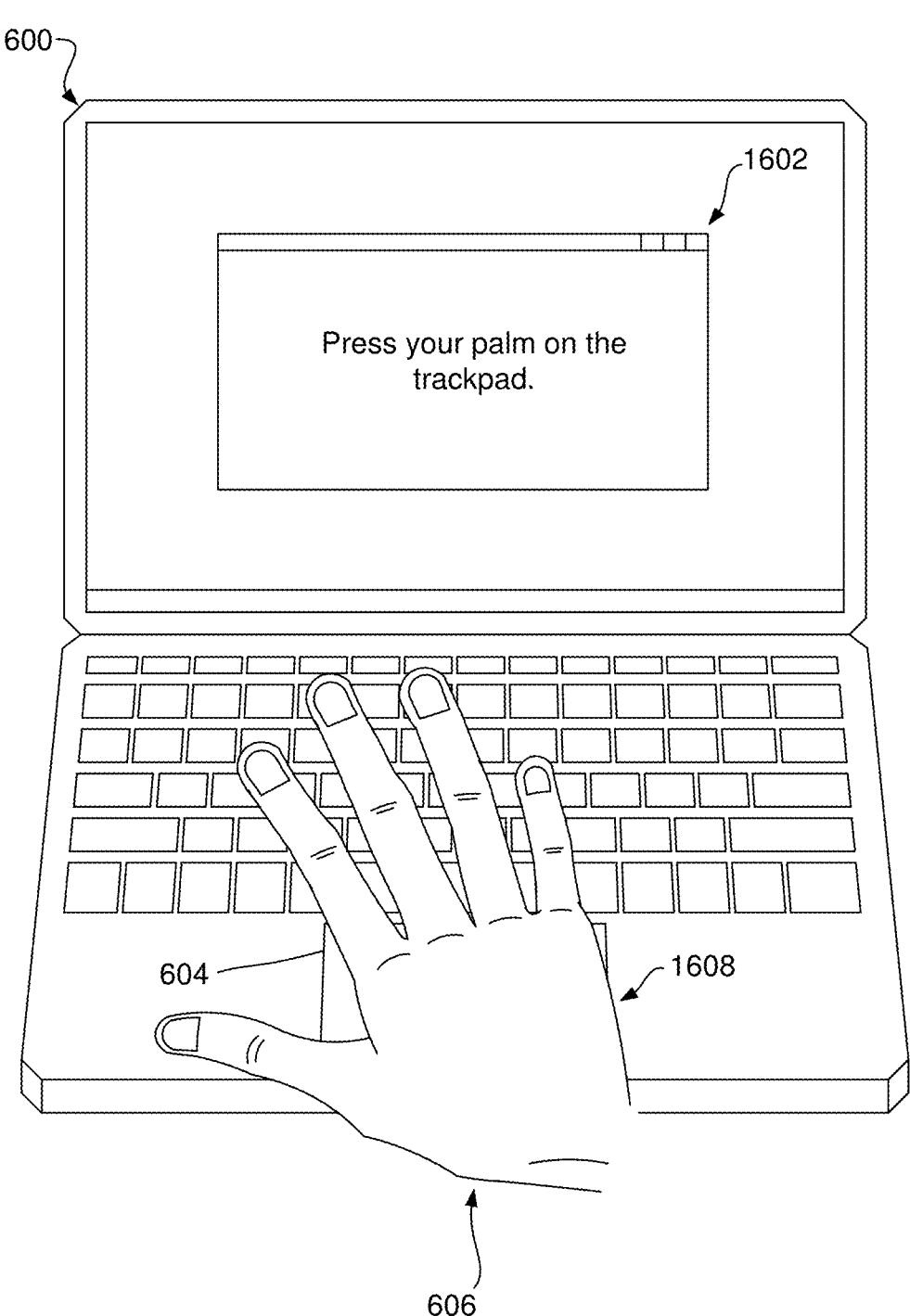
FIG. 16 depicts an example of an electronic device in accordance with the disclosure.

FIG. 16 depicts an example of the electronic device 600 displaying a prompt 1602 to the user 606 to perform a palm press on the input device 604 during a calibration process. As a palm press input 1608 is provided, the input device 604 may measure capacitance values associated with the input, form a reference dataset, and store the dataset in memory resources. A palm press input may generate large contact areas and capacitance changes that could be mistaken for high-pressure finger presses. By explicitly calibrating for palm presses 1608, the system may learn to differentiate between intended firm finger presses and inadvertent palm contacts.

Figure 17:
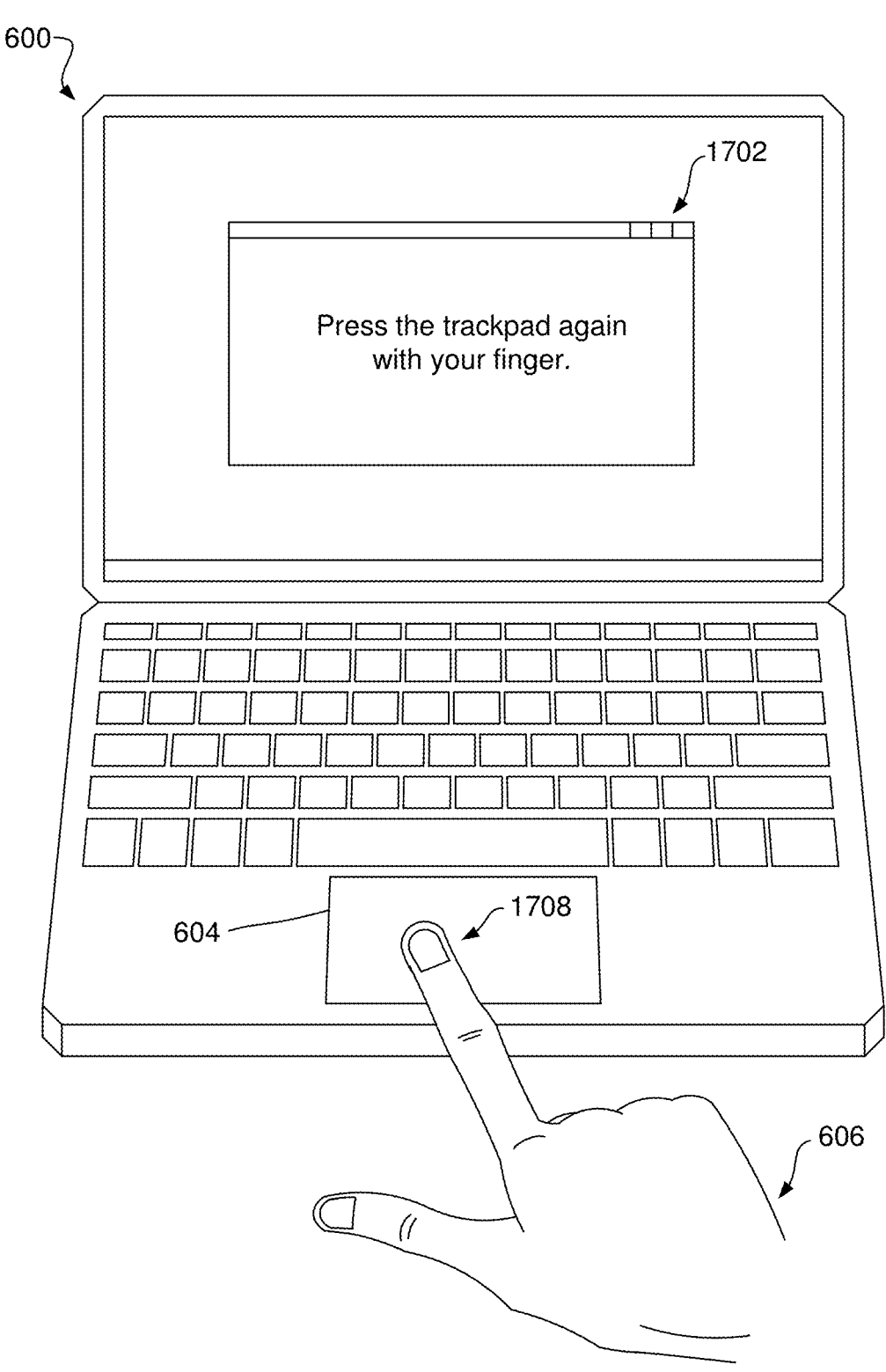
FIG. 17 depicts an example of an electronic device in accordance with the disclosure.

FIG. 17 depicts an example of the electronic device 600 displaying a prompt 1702 to the user 606 to perform a touch input on the input device 604 during a recalibration process. As a touch recalibration input 1708 is provided, the input device 604 may measure capacitance values associated with the input and modify a reference dataset stored in memory resources. Over time, a user's pressing style may drift from an initial calibration, or the capacitive sensor characteristics of a capacitance module may change. Occasional recalibration inputs 1708 may allow a system to update its pressure classification models to maintain accuracy.

In some cases, the system may automatically initiate recalibration prompts if it detects a degradation in input classification confidence. In other cases, the system may automatically recalibrate with explicit prompts to a user. In some cases, the recalibration process occurs based on a schedule or a periodic interval. In other examples, other triggers may initiate the recalibration process.

Figure 18:
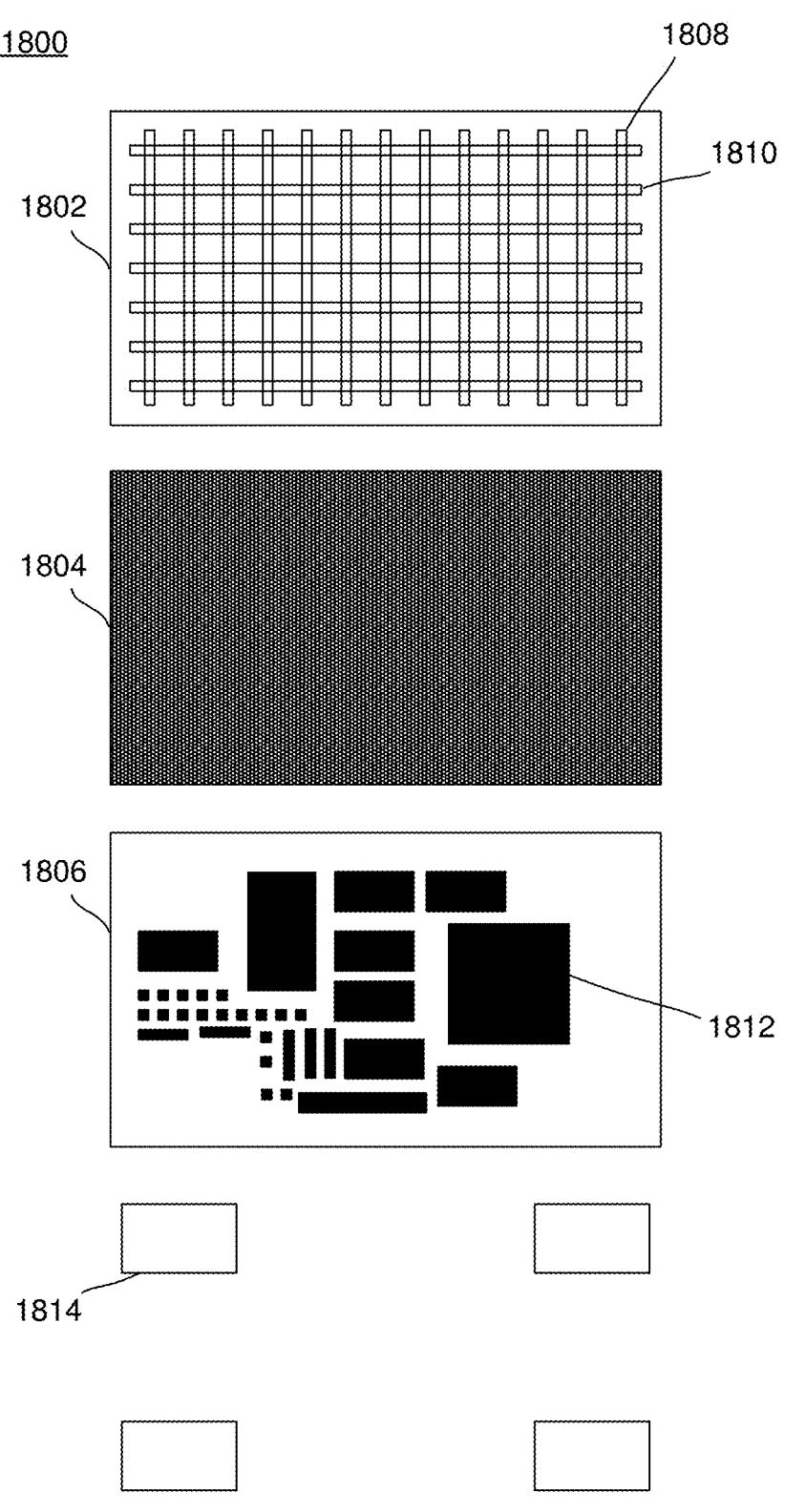
FIG. 18 depicts an example of a capacitance module in accordance with the disclosure.

FIG. 18 depicts an example of a capacitance module 1800 in accordance with the disclosure. In this example, the capacitance module 1800 includes a sensor layer 1802 with a first set 1808 and second set 1810 of electrodes, a shield layer 1804, a component layer 1806 with components 1812, and pressure sensors 1814. In this example the pressure sensors 1814 are located adjacent to the component layer. In other examples, pressure sensors may have a different relative location in a capacitance module.

In this example, the capacitance module 1800 includes four pressure sensors 1814. In other examples, a capacitance module may have a different number of pressure sensors.

When a user applies pressure to the reference surface of the capacitance module 1800, mechanical deformation may be transmitted through the various layers 1802, 1804, 1806 and be registered by the pressure sensors 1814. The pressure sensors 1814 may provide a direct measurement of the applied force, complementing capacitive measurements taken by the electrodes on the sensor layer 1802.

The pressure sensors 1814 may be strain gauges, piezo-electric pressure sensors, inductance coil pressure sensors, another type of pressure sensor, or combinations thereof. A non-exhaustive list of suitable pressure sensors includes, but is not limited to, piezoelectric sensors, magnostrictive sensors, potentiometric pressure sensors, inductive pressure sensors, capacitive pressure sensors, strain gauge pressure sensors, variable reluctance pressure sensors, non-capacitance pressure sensors, other types of pressure sensors, or combinations thereof.

Figure 19A:
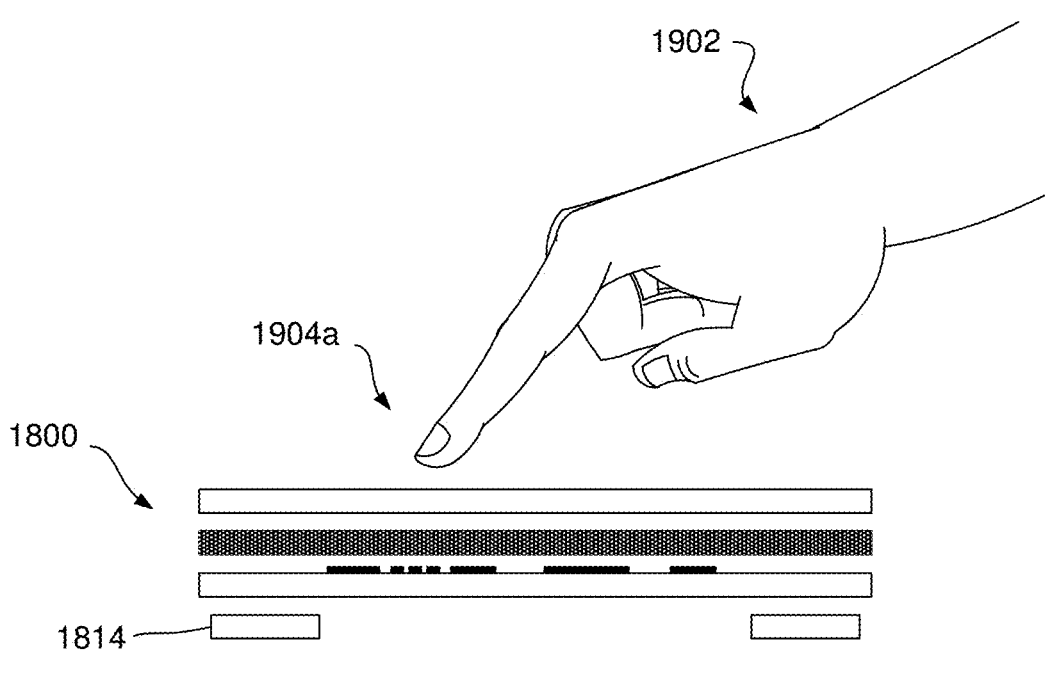
FIG. 19a depicts an example of a press input in accordance with the disclosure.
Figure 19B:
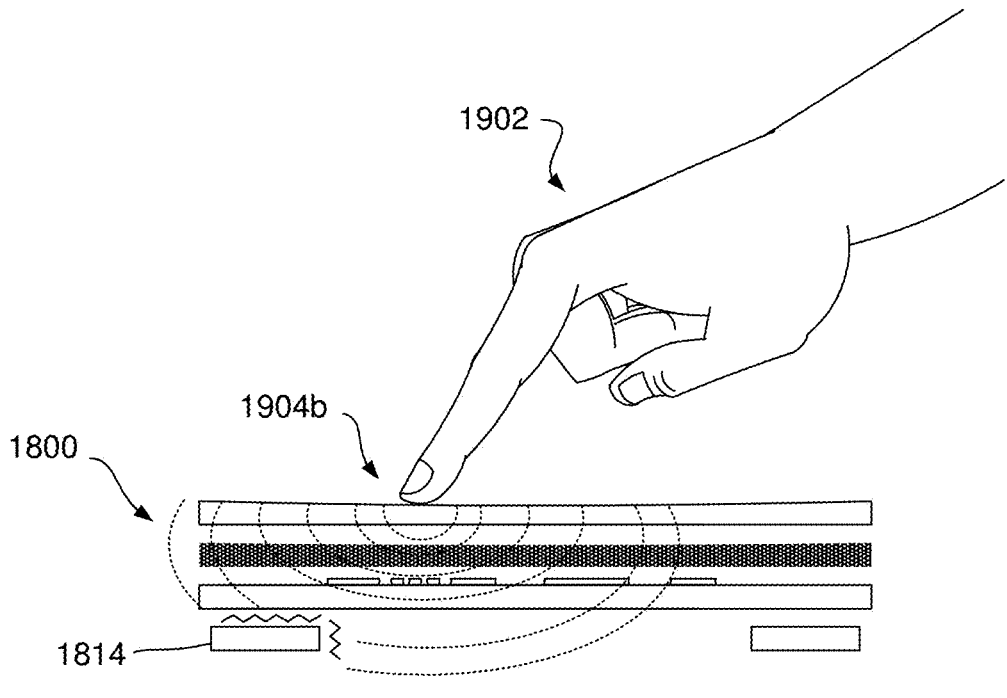
FIG. 19b depicts an example of a press input in accordance with the disclosure.

FIG. 19a depicts an example of a press input at a first point in time and FIG. 19b depicts an example of the press input at a second point in time in accordance with the disclosure. In this example, a user 1902 lowers a finger to make physical contact with the reference surface of the capacitance module 1800.

Before physical contact, the press input 1904a may be detected by proximity by the capacitance module. After physical contact with the reference surface and applying a force to the reference surface, the press input 1904b may deform the reference surface and which may be detected with the pressure sensors 1814.

A calibration process may include both pressure sensor data and capacitance sensor measurements. In some examples, during calibration data from the pressure sensors 1814 may provide absolute measurements or relative measurements of the force applied. In some examples where the pressure sensor does not use capacitance to measure the force, the system may build a model that maps the capacitive signal characteristics to the signal characteristics of the pressure sensor. In one example, the pressure sensor may be a strain gauge that measures changes in resistance. In this example, the measured changes in resistance may be mapped against the changes in capacitance. In another example, the pressure sensor may be piezoelectric sensor. In this example, the changes in the piezoelectric measurement may be mapped against the capacitance measurements. In either of these examples, the system may correlate the pressure sensor measurements to a capacitance measurement to determine the type of input. In yet other examples, the capacitance signature of a press input may be associated with a press input, and the system may determine when a press input is made from the capacitance measurement even though the pressure sensor is a non-capacitance pressure sensor.

In some examples where the pressure sensor measures an absolute pressure, the capacitance signal from the capacitance sensor and the pressure signal from the non-capacitance sensor may raise together at about the same time. Likewise in some examples where the pressure sensor measures an absolute pressure, the capacitance signal from the capacitance sensor and the pressure signal from the non-capacitance sensor may fall together at about the same time. In such embodiments, the system may derive capacitance signal based on the presence of the pressure signal. In such examples, the duration of the capacitance signal may be determined based on the rise and fall of the non-capacitance pressure signal.

In some examples where the pressure sensor measures a relative pressure, the capacitance signal from the capacitance sensor and the pressure signal from the non-capacitance sensor may raise together at about the same time. However, in some examples where the pressure sensor measures a relative pressure, the capacitance signal from the capacitance sensor and the pressure signal from the non-capacitance sensor may fall at different times since the capacitance signal is an absolute measurement. In such an example, the capacitance signal may remain elevated for the entire duration that the pressure signal is applied, but the pressure signal may fall before the press input ends. In such embodiments, the system may derive the continuation of the press input until the capacitance signal falls. In such examples, the duration of the press input may be determined based on the rise and fall of the capacitance signal even though the pressure sensor does not use capacitance.

Further, in examples where the pressure sensor is a relative pressure sensor, the change in intensity direction and/or value of the pressure signal may be determined with the capacitance signal even though the pressure sensor does not use capacitance to measure the pressure. For example, the pressure signal and the capacitance signal may rise together, and the pressure signal may fall while the capacitance signal is maintained. If the capacitance signal then has an increase, it may be determined that the pressure exerted on the press input as also increased. In other examples, if the capacitance signal then has a decrease, but does not drop below a predetermined threshold, it may be determined that the pressure exerted on the press input is also decreased, but that the press input continues to be maintained.

Other examples of how the capacitance measurements may be correlated with the relative pressure measurements may be found in U.S. patent application Ser. No. 18/226,454 filed on Jul. 26, 2023 to David Orr and entitled Pressure Sensing in a Capacitance Module. U.S. patent application Ser. No. 18/226,454 is incorporated by reference for all that is discloses.

In some examples, a system may apply trained models to predict pressure from capacitive measurements alone, even without included pressure sensors activated. This may help conserve power, as types of pressure sensors may consume more energy than capacitive sensors. In some cases, a system may activate pressure sensors only when capacitive data is ambiguous, or to periodically recalibrate the capacitive-to-pressure model. In other examples, a system may make pressure measurements using both capacitive sensing methods and pressure sensor data in combination. Using both types of measurements may enable a capacitance module to make finer-grained pressure estimations.

The combination of capacitive and pressure sensor data during a calibration process may enable more robust and reliable pressure detection. The capacitive data may capture the nuances of a user's finger approach and contact, while the pressure sensors may provide an absolute or relative reference for the applied force. By learning the relationship between these two modalities, the system may achieve accurate pressure classification over a wide range of input scenarios and user variations.

In some examples, a pressure sensor may be configured to only provide relative pressure measurements. In these examples, using capacitive sensor data in combination with relative pressure measurements from pressure sensors may enable a capacitance module to determine an absolute input pressure. In other examples, a pressure sensor may be configured to only provide absolute pressure measurements. In these examples, using capacitive sensor data in combination with absolute pressure measurements from pressure sensors may enable a capacitance module to determine a relative input pressure.

Figure 20:
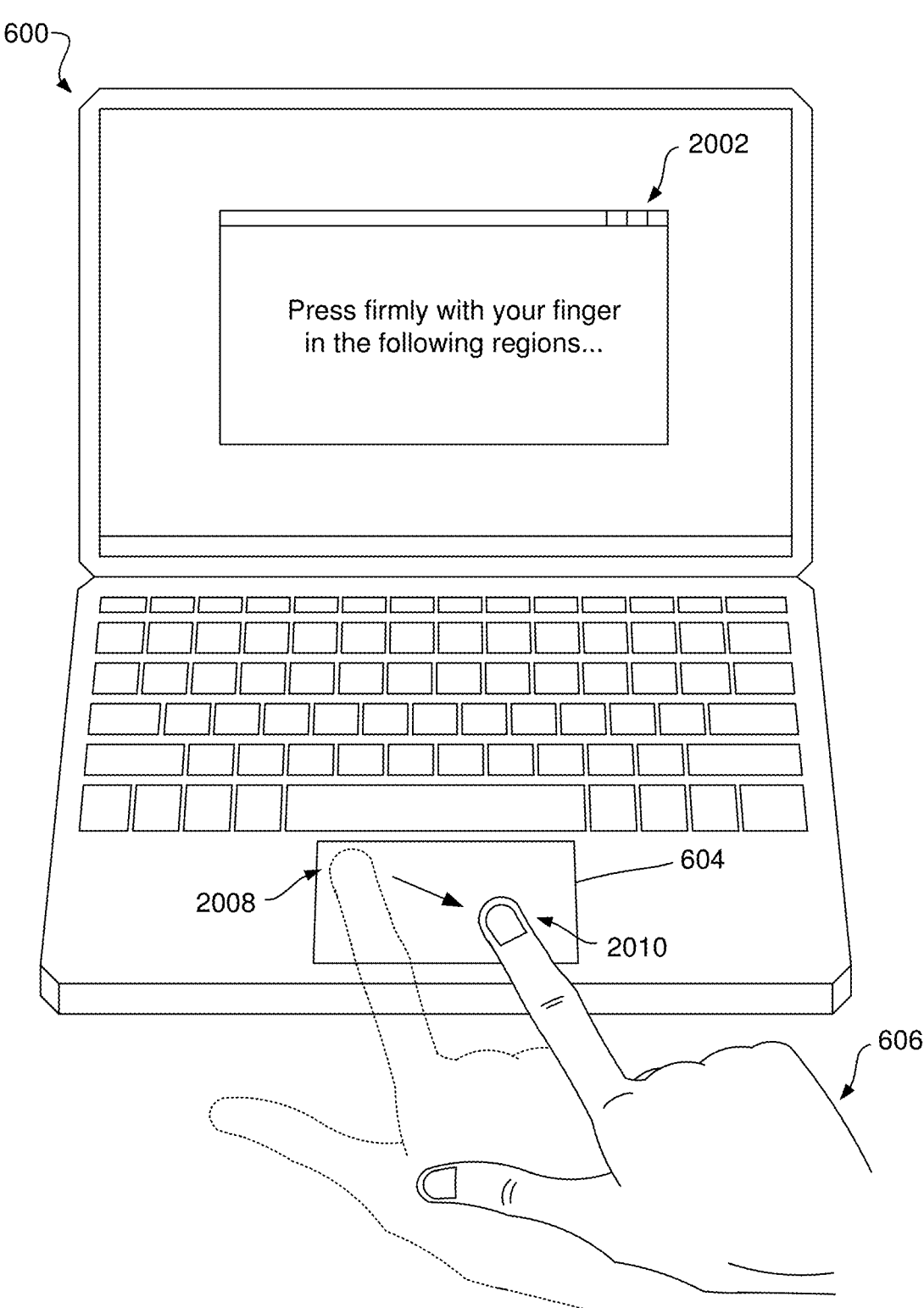
FIG. 20 depicts an example of an electronic device in accordance with the disclosure.

FIG. 20 depicts an example of the electronic device 600 displaying a prompt 2002 for the user 606 to perform multiple press inputs at different parts of the input device 604 during a calibration process.

The reference surface of a capacitance module may have a non-uniform mechanical deformation. For example, the center of a trackpad surface may flex more easily than the edges or corners under the same applied pressure due to the distribution of structural support under the reference surface. This may lead to inconsistent pressure classifications if a single, global threshold for pressure is used.

By prompting the user 606 to perform a press input at a first location 2008 and second location 2010 on the surface of the input device 604, the system may build a spatial map of the pressure response across the surface. This pressure threshold map may allow the system to compensate for regional variations in stiffness and sensitivity on a reference surface.

Figure 21A:
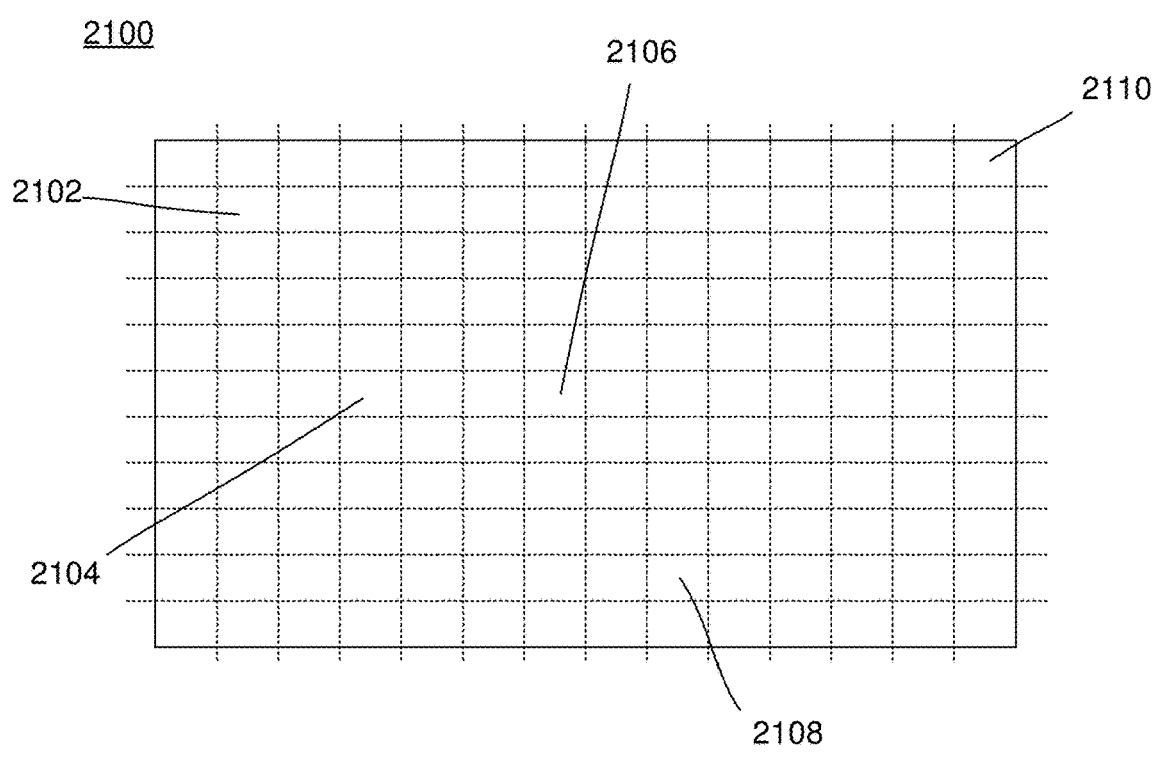
FIG. 21a depicts an example of pressure threshold map in accordance with the disclosure.

FIG. 21a depicts an example of a pressure threshold map 2100 in accordance with the disclosure. In this example, the threshold map 2100 includes several regions with five regions highlighted: a first region 2102 in the upper left corner of the reference surface, a second region 2104 in the center left of the reference surface, a third region 2106 in the approximate center of the reference surface, a fourth region 2108 along the lower edge of the reference surface, and fifth region 2110 in the upper right corner of the reference surface.

While the threshold map 2100 in this examples features 154 distinct regions, this distinction is for illustrative purposes only. A threshold map may have thousands of distinct pressure regions, two pressure regions, three pressure regions, a different number of pressure regions, or combinations thereof. In other examples, the pressure regions may be concentric, symmetrical, non-concentric, asymmetrical, or combinations thereof.

In some examples, the pressure threshold associated with a pressure region may be discretely calculated during a calibration process. In other examples, the threshold for each region may be approximated using interpolation algorithms.

Figure 21B:
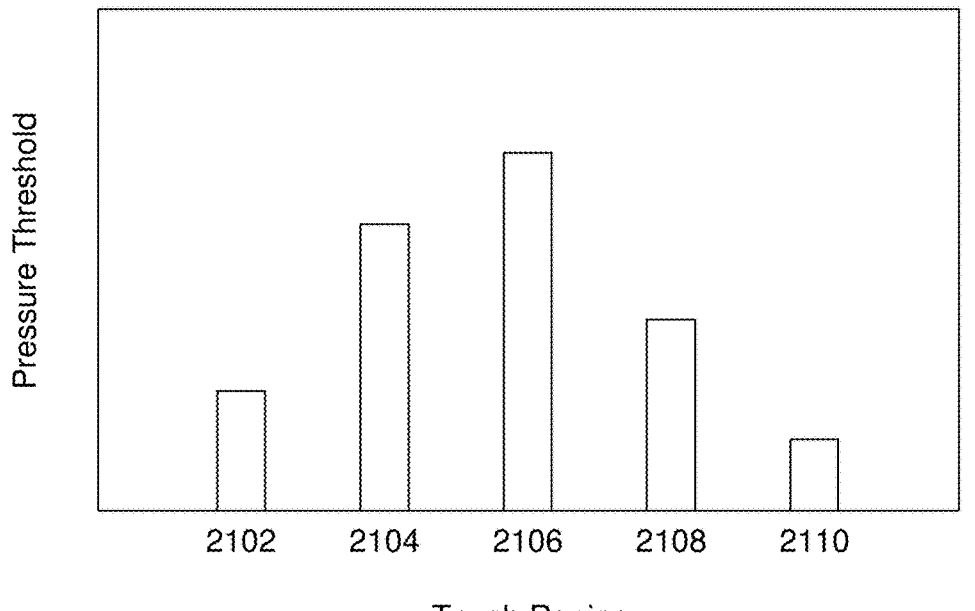
FIG. 21b depicts an example of pressure thresholds in accordance with the disclosure.

FIG. 21b depicts an example of pressure thresholds in accordance with the disclosure. In this example, each pressure threshold corresponds to a pressure region depicted in FIG. 21a. The third region 2106 has the highest-pressure threshold, indicating that it requires the most pressure to register a firm press. This may be consistent with the center of a reference surface being the most mechanically flexible part of a capacitance module. The pressure thresholds for the pressure regions 2102 and 2110 may be lower compared to the pressure thresholds of the other pressure regions, indicating that they require the least pressure to register a firm press. This may be consistent with the edges of a reference surface being the least mechanically flexible.

When a user applies pressure to a reference surface, the system may first identify a region of contact based on the location of the peak capacitance signal strength or the slope of the capacitance signal. Next, the system may retrieve the pressure threshold associated with that region from the pressure threshold map 2100. The capacitance data and pressure sensor readings (if available) may be compared to the regional threshold to determine the pressure classification of the input.

By adapting the pressure classification to the regional sensitivity of the capacitance module, the system may ensure a more consistent user experience. The user may apply the same perceived pressure at any location on the reference surface and obtain the expected result, even though the actual mechanical deformation and sensor readings may vary.

In some examples, a pressure threshold may be personalized to each user, as it is derived from their individual calibration data. This may account for variations in pressing style and finger size, which can influence pressure distribution.

The pressure threshold map 2100 may be periodically updated through ongoing calibration prompts to adapt to any changes in user behavior or the mechanical response of an input device over time.

The pressure threshold map 2100 may translate raw sensor data into a normalized pressure space that is consistent across the reference surface of a capacitance module and tailored to a user's natural input style. This may allow for more accurate and reliable pressure classification, enhancing the overall user experience and enabling a wider range of pressure-sensitive interactions.

In some cases, the pressure thresholds for a press input to be detected may be adjusted. For example, if the location of the press input is identified as being far away from a pressure sensor, the pressure threshold required to register a press input may be lowered so that the user feels like he or she is pressing the same amount at the locations located directly over the pressure sensors before a press input is registered. In some examples, where the identification of a press input triggers a haptic response, the user may feel like he or she just has to apply the same force regardless of where the pressure sensors are located, but the pressure thresholds mapped to the capacitance reference surface are different.

Figure 22:
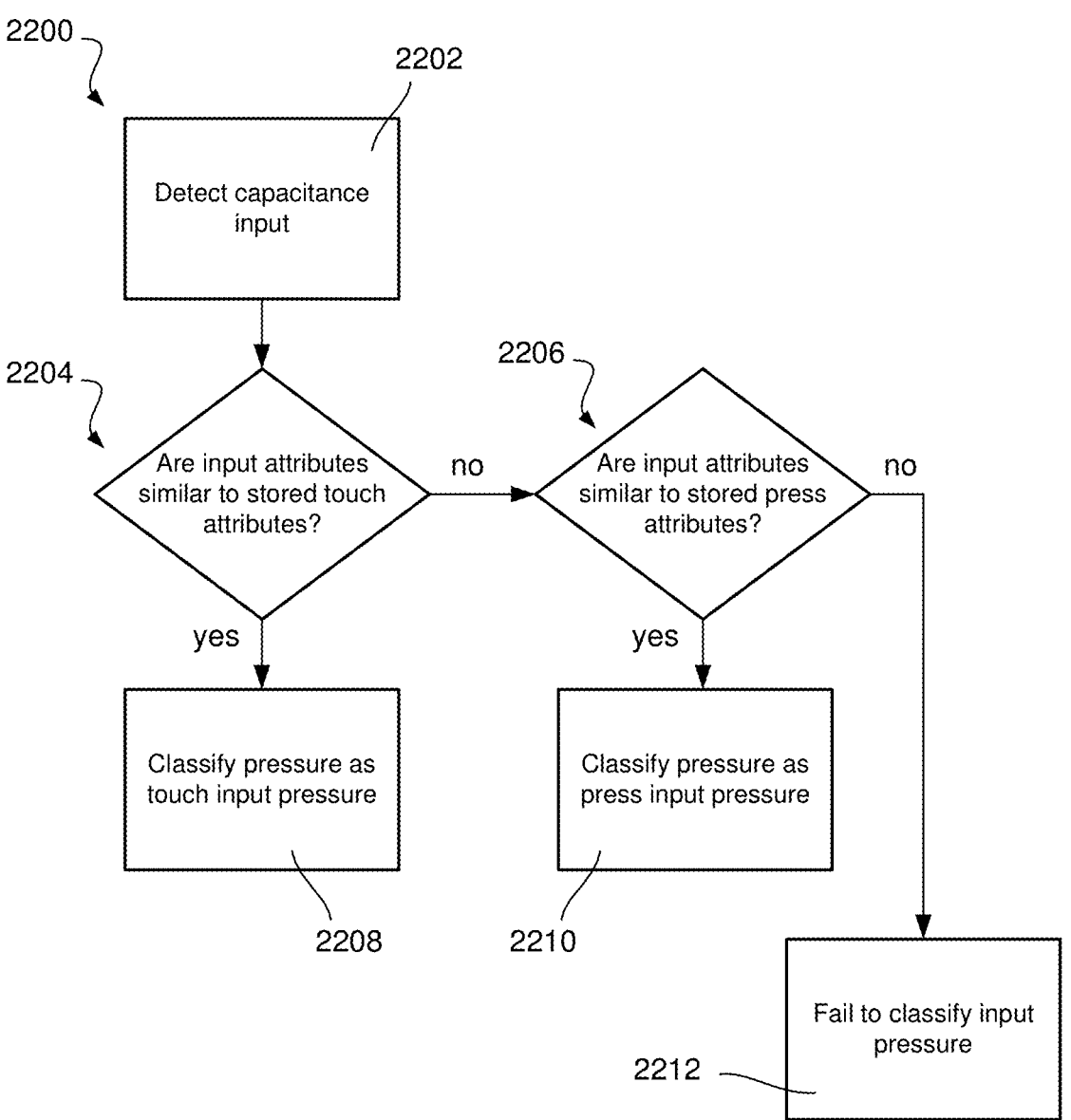
FIG. 22 depicts an example of a method for determining an input pressure in accordance with the disclosure.

FIG. 22 depicts an example of a method 2200 for classifying the pressure of an input on a capacitance module. This method 2200 may be performed based on the description of the devices, modules, and principles described in relation to FIGS. 1-21b. During operation, the capacitance module may detect 2202 a capacitance input. The capacitance module may make a first determination 2204 if at least one of the input attributes is similar to a stored touch attribute. If the input attributes are similar to the stored touch attributes, the capacitance module may classify 2208 the pressure of the input as a touch input pressure. If the input attributes are not similar to the stored touch attributes, the capacitance module may make a second determination 2206 if at least one of the input attributes is similar to a stored press attribute. If the input attributes are similar to the stored press attributes, the capacitance module may classify 2210 the pressure of the input as a press input pressure. If the input attributes are not similar to the stored press attributes, the capacitance module may fail 2212 to classify the pressure of the input. In other examples, the system may perform another operation if the input attribute is not similar to the touch or pressure stored attributes.

Figure 23:
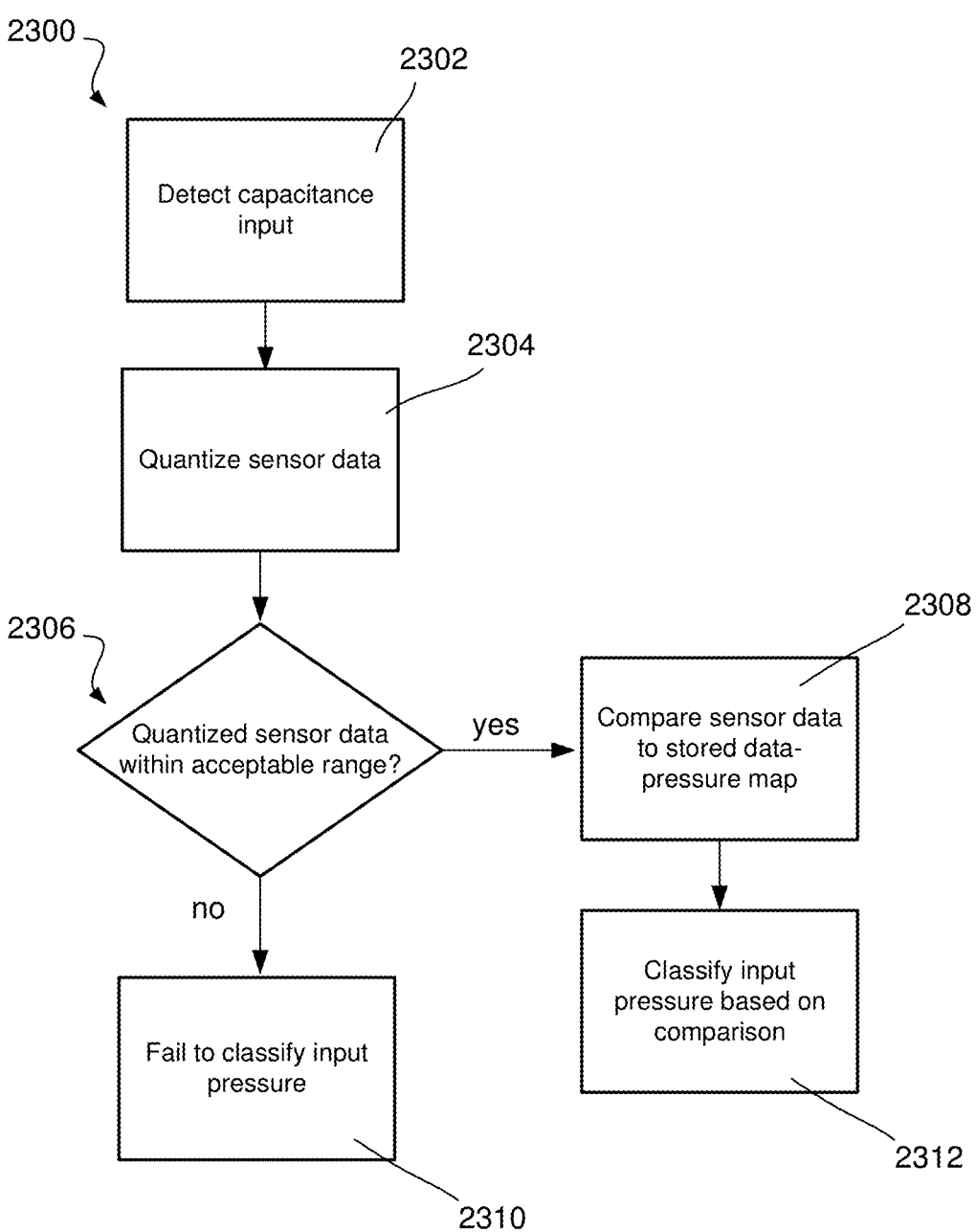
FIG. 23 depicts an example of a method for determining an input pressure in accordance with the disclosure.

FIG. 23 depicts an example of a methods 2300 for classifying the pressure of an input on a capacitance module. This method 2300 may be performed based on the description of the devices, modules, and principles described in relation to FIGS. 1-21b. During operation, the capacitance module may detect 2302 a capacitance input. The capacitance module may quantize 2304 the sensor data in preparation for the sensor data to be analyzed according to a stored pressure map. The capacitance module may make a first determination 2306 if the quantized sensor data is within an acceptable range. If the sensor data is not within an acceptable range, the capacitance module may fail 2310 to classify the input pressure. If the sensor data is within an acceptable range. The capacitance module may compare 2308 the quantized sensor data to a data-pressure map stored in memory resources created during a calibration stage. The capacitance module may classify 2312 the input pressure based on the comparison with the data-pressure map.

In examples where a capacitance module makes a pressure classification based on a data-pressure map, such as the example depicted in FIG. 23, the pressure classification may be more fine-grained than simple binary touch/press pressure classifications.

During a calibration process, a capacitance module may train machine learning models based on measurements gathered during the calibration process. During operation, inputs to the capacitance module may be passed to the machine learning models, and the inputs may be classified based, at least in part, on the output of the models.

A machine learning model may be a k-nearest neighbors model, a logistic regression model, a decision tree model, a random forest model, a gradient boosting machine, a support vector machine, a neural network, another machine learning model, or combinations thereof.

In some examples, a machine learning model may be trained and stored on processing resources and memory belonging to a capacitance module itself. In other examples, a machine learning model may be trained and stored on device resources pertaining to a device in electronic communication with a capacitance module.

The capacitance module may cause the calibration process to be initiated when a user sets up his or her profile associated with an electronic device. In some examples, the calibration process may be initiated in response to a user request. In some examples, the calibration process may be initiated in response to an event-based trigger, such as turning on an electronic device, updating software, changing a setting associated with the input device, a program request, a user request, opening a program with the electronic device, updating a user profile, another event-based trigger, or combinations thereof. In some examples, the calibration process may be reinitiated on a reoccurring basis.

In cases where the calibration process is repeated, the datasets gathered from the previous calibration process may be replaced with datasets from the most recent calibration.

However, in other examples, the dataset from the most recent calibration may be used to update or refine processed stored attributes. In other examples, the store attributes may include attributes from multiple calibrations.

In some examples, each unique user of an electronic device may have his or his own profile. In such an example, each profile may be associated with a unique dataset having stored attributes unique to each user.

Figure 24:
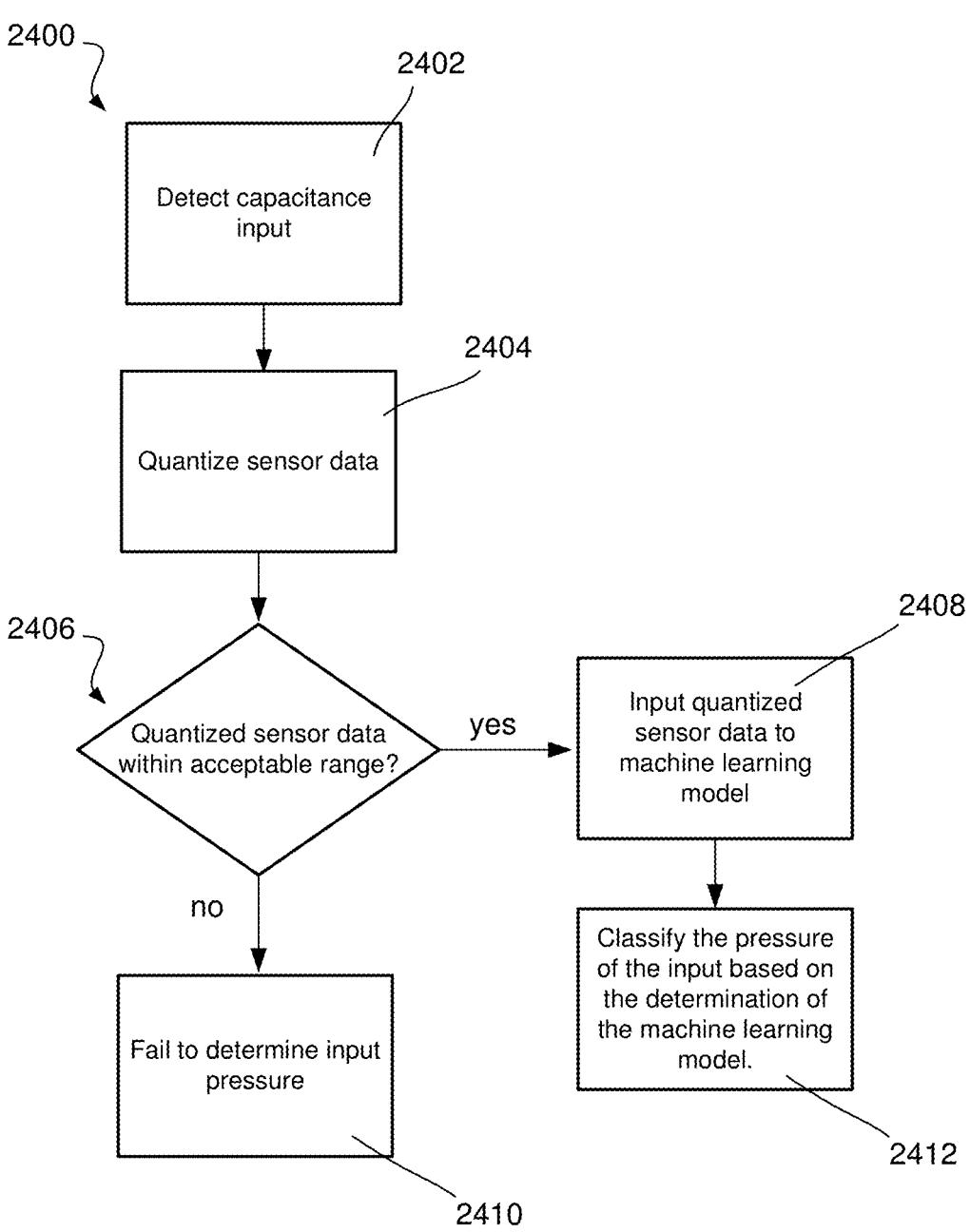
FIG. 24 depicts an example of a method for determining an input pressure in accordance with the disclosure.

FIG. 24 depicts an example of a decision tree 2400 for classifying the pressure of an input to a capacitance module using a machine learning model in accordance with the disclosure. This method 2400 may be performed based on the description of the devices, modules, and principles described in relation to FIGS. 1-21*b*. A capacitance module may detect 2402 a capacitance input. The capacitance module may quantize 2404 the sensor data. The capacitance module may make a determination 2406 whether the quantized sensor data is within an acceptable range. If the quantized sensor data is not within an acceptable range, the capacitance module may fail 2410 to classify the input pressure. If the quantized sensor data is within an acceptable range, the capacitance module may input 2408 the quantized sensor data into a machine learning model. The capacitance module may classify 2412 the pressure of the input based on the determination of the machine learning model.

In this example, the capacitance module consults a single machine learning model to classify the pressure of the input. In other examples, a capacitance module may consult multiple machine learning models trained on a combination of inputs gathered during a calibration process. In other examples, a capacitance module may make a pressure classification based on the determination of a machine learning model in combination with conventional sensor measurements, pressure threshold maps, or combinations thereof.

Figure 25:
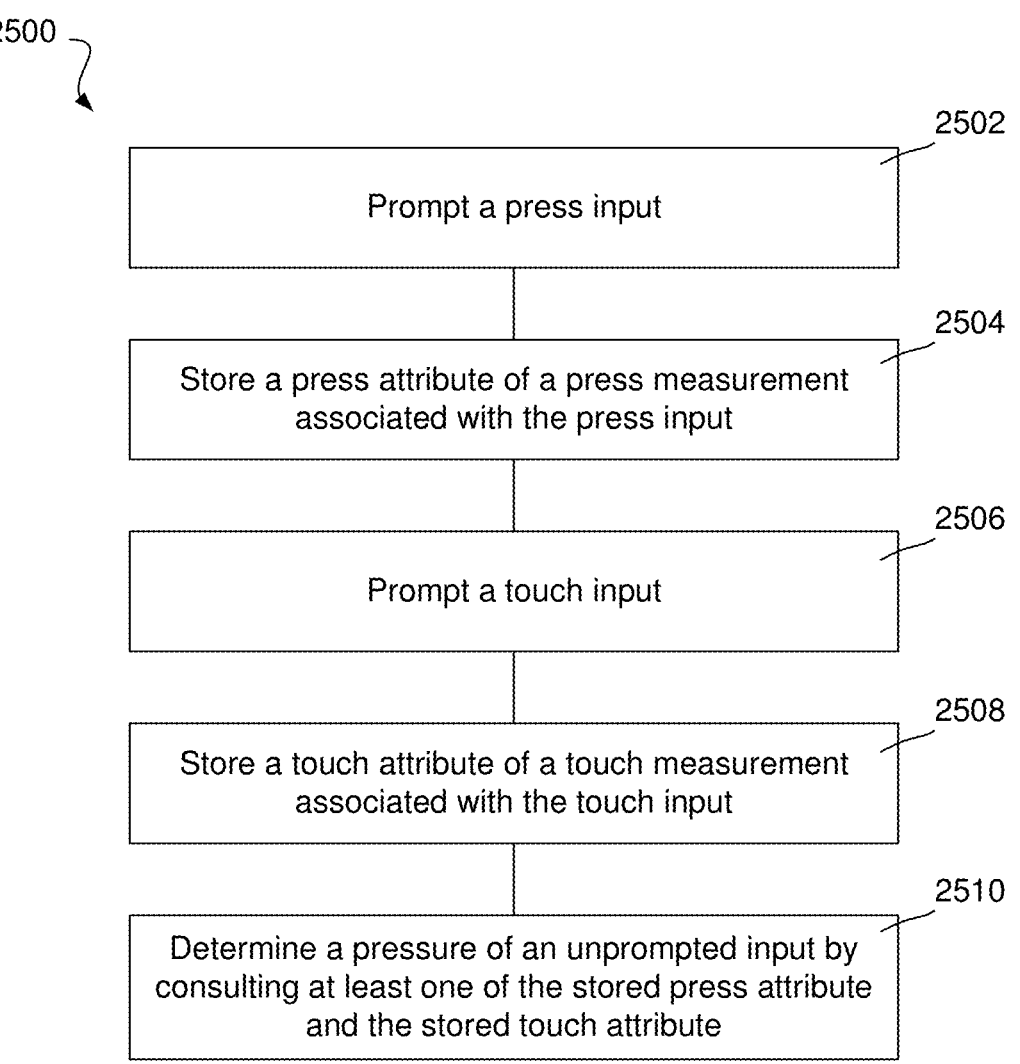
FIG. 25 depicts an example of a method for determining a pressure of an unprompted input in accordance with the disclosure.

FIG. 25 depicts an example of a method 2500 for classifying the pressure of an input in accordance with the disclosure. This method 2500 may be performed based on the description of the devices, modules, and principles described in relation to FIGS. 1-21*b*. During a calibration process, a capacitance module may prompt 2502 a press input. The capacitance module may store 2504 a press attribute of a press measurement associated with the press input. The capacitance module may prompt 2506 a touch input and store 2508 a touch attribute of a touch measurement associated with the touch input. The capacitance module may determine 2510 a pressure of an unprompted input by consulting at least one of the stored press attribute and the stored touch attribute.

FIG. 26 depicts an example of a method 2600 for classifying the pressure of an input in accordance with the disclosure. This method 2600 may be performed based on the description of the devices, modules, and principles described in relation to FIGS. 1-21*b*. During a calibration process, a capacitance module may prompt 2602 a press input. The capacitance module may store 2604 a press attribute of a press measurement associated with the press input. The capacitance module may prompt 2606 a touch input and store 2608 a touch attribute of a touch measurement associated with the touch input. The capacitance module may prompt 2610 a corner press input and store 2612 a corner press attribute of a corner press measurement associated with the corner press input. The capacitance module may determine 2614 a pressure of an unprompted input by consulting at least one of the stored press attribute, the stored touch attribute, and the stored corner press attribute.

FIG. 27 depicts an example of a method 2700 for classifying the pressure of an input in accordance with the disclosure. This method 2700 may be performed based on the description of the devices, modules, and principles described in relation to FIGS. 1-21*b*. During a calibration process, a capacitance module may prompt 2702 a press input. The capacitance module may store 2704 a press attribute of a press measurement associated with the press input. The capacitance module may store 2706 a trend in capacitance signal strength during the press input and modify 2708 the press attribute based on the trend. The capacitance module may prompt 2710 a touch input and store 2712 a touch attribute of a touch measurement associated with the touch input. The capacitance module may determine 2714 a pressure of an unprompted input by consulting at least one of the stored press attribute and the stored touch attribute.

FIG. 28 depicts an example of a method 2800 for classifying the pressure of an input in accordance with the disclosure. This method 2800 may be performed based on the description of the devices, modules, and principles described in relation to FIGS. 1-21*b*. During a calibration process, a capacitance module may prompt 2802 a press input and store 2804 a press attribute of a press measurement associated with the press input. The capacitance module may prompt 2806 an additional press input for a different location on the capacitance module and store 2808 an additional press attribute of an additional press measurement associated with the additional press input. The capacitance module may create 2810 a pressure threshold map with different pressure threshold attributes associated with different locations on the capacitance module based on the additional press input. The capacitance module may determine 2812 a pressure of an unprompted input by consulting the pressure threshold map.

It should be noted that the methods, systems, and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various steps may be added, omitted, or combined. Also, features described with respect to certain embodiments may be combined in various other embodiments. Different aspects and elements of the embodiments may be combined in a similar manner. Also, it should be emphasized that technology evolves and, thus, many of the elements are exemplary in nature and should not be interpreted to limit the scope of the invention.

Specific details are given in the description to provide a thorough understanding of the embodiments. However, it will be understood by one of ordinary skill in the art that the embodiments may be practiced without these specific details. For example, well-known circuits, processes, algorithms, structures, and techniques have been shown without unnecessary detail in order to avoid obscuring the embodiments.

Also, it is noted that the embodiments may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

The invention claimed is:

1. A capacitance module, comprising:
a set of electrodes;
a processor in communication with the set of electrodes;
memory in communication with the processor;
wherein the memory includes programmed instructions that cause the capacitance module, when executed, to perform a calibration, the calibration comprising:
prompting a press input;
storing a press attribute of a press measurement associated with the press input;
deriving a press threshold value based on the stored press attribute; and
determining a type of unprompted input is a press input by comparing the unprompted input to the derived press threshold value;
wherein the stored press attribute does not include a fingerprint attribute.

2. The capacitance module of claim 1, the calibration further comprising:
prompting a touch input;
storing a touch attribute associated with the touch input;
wherein determining the type of the unprompted input includes consulting at least one of the stored press attribute and the touch attribute.

3. The capacitance module of claim 1, the calibration further comprising:
prompting a double press input and storing a double press attribute of a double press measurement associated with the double press input.

4. The capacitance module of claim 2, wherein determining the type of the unprompted input includes consulting at least one of the stored press attribute, the touch attribute, and the double press attribute.

5. The capacitance module of claim 1, the calibration further comprising:
prompting a corner press input;
storing a corner press attribute of a corner press measurement associated with the corner press input;
wherein the corner press attribute includes a different pressure measurement than the pressure attribute.

6. The capacitance module of claim 1, the pressure calibration further comprising:
prompting a finger press input;
storing a finger press attribute of a finger press measurement associated with the finger press input;
prompting a palm press input; and
storing a palm press attribute of a palm press measurement associated with the palm press input.

7. The capacitance module of claim 1, wherein the press attribute includes at least one contact area, capacitance signal strength, or capacitance signal trend.

8. The capacitance module of claim 1, further comprising a pressure sensor in communication with the processor; wherein the press attribute includes a pressure magnitude.

9. The capacitance module of claim 1, the pressure calibration further comprising:
prompting multiple press inputs at different locations on the capacitance module; and creating a pressure threshold map containing multiple regions that each have a discretely determined press threshold that vary across the surface of the capacitance module based on the multiple press inputs;
wherein the map compensates for regional variations across the surface.

10. The capacitance module of claim 1, the calibration further comprising:
prompting a subsequent press input; and
using a subsequent press attribute of a subsequent press measurement associated with the prompted subsequent press input to modify the stored press attribute.

11. The capacitance module of claim 1, the calibration further comprising:
prompting a subsequent touch input; and
using a subsequent touch attribute of a subsequent touch measurement associated with the prompted subsequent touch input to modify the stored press attribute.

12. The capacitance module of claim 1, further comprising:
creating a press attribute using a press machine learning model; and
training the press machine learning model with multiple press measurements from prompted press inputs at various locations on the capacitance module.

13. A method for determining a press input on a capacitance module, comprising:
prompting a press input;
storing a press attribute of a press measurement associated with the press input;
prompting a touch input;
storing a touch attribute of a touch measurement associated with the touch input;
deriving a press threshold value based on the stored press attribute and the stored touch attribute; and
determining an unprompted input is a press input by comparing the unprompted input to the derived press threshold value;
wherein the stored press attribute does not include a fingerprint attribute.

14. The method of claim 13, further comprising:
prompting a corner press input;
storing a corner press attribute of a corner press measurement associated with the corner press input;
wherein the corner press attribute includes a different pressure measurement than the pressure attribute.

15. The method of claim 13, further comprising:
recording a trend in capacitance signal strength during the press input and the touch input; and
adjusting the press attribute based on the trend.

16. The method of claim 13, further comprising:
prompting at least one additional press inputs for at least one different location on the capacitance module; and
creating a pressure threshold map with different pressure threshold attributes associated with different locations of the capacitance module based on the additional press input.

17. A computer-program product for determining a press input on a capacitance module; the computer-program product comprising a non-transitory computer-readable medium storing instructions executable by a processor to:
prompt a press input;
store a press attribute of a press measurement associated with the press input;
prompt a touch input;
store a touch attribute of a touch measurement associated with the touch input;

deriving a press threshold value based on the stored press attribute and the stored touch attribute; and determine a type of unprompted input is a press input by comparing the unprompted input to the derived press threshold value;

wherein the stored press attribute does not include a fingerprint attribute.

18. The computer-program product of claim 17, the instructions being executable to:

prompt a corner press input;

store a corner press attribute of a corner press measurement associated with the corner press input;

wherein determining the unprompted input is the press input includes adjusting the derived pressure threshold value based on the location of the unprompted input on the capacitance module.

19. The computer-program product of claim 17, the instructions being executable to:

record a trend in capacitance signal strength during the press input; and adjust the press attribute based on the trend.

20. The computer-program product of claim 17, the instructions being executable to:

prompt an additional press input at a different location on the capacitance module; and create a pressure threshold map with different pressure threshold attributes associated with different locations of the capacitance module based on the additional press input.

\* \* \* \* \*